US010636258B1

(12) United States Patent
Mercer et al.

(10) Patent No.: US 10,636,258 B1
(45) Date of Patent: Apr. 28, 2020

(54) AUTOMATED BANKING MACHINE CONTROLLED RESPONSIVE TO DATA BEARING RECORDS WITH SECURE CHEST

(71) Applicant: Porter's Group, LLC, Kings Mountain, NC (US)

(72) Inventors: Scott Allan Mercer, Kings Mountain, NC (US); Russell Shaun Tyler, Hickory, NC (US)

(73) Assignee: PORTER'S GROUP, LLC, Gastonia, NC (US)

( * ) Notice: Subject to any disclaimer, the term of this patent is extended or adjusted under 35 U.S.C. 154(b) by 146 days.

(21) Appl. No.: 15/848,586

(22) Filed: Dec. 20, 2017

Related U.S. Application Data

(60) Provisional application No. 62/546,087, filed on Aug. 16, 2017, provisional application No. 62/439,684, filed on Dec. 28, 2016.

(51) Int. Cl.
| | |
|---|---|
| *G07F 19/00* | (2006.01) |
| *E05G 1/024* | (2006.01) |
| *G06Q 20/10* | (2012.01) |

(52) U.S. Cl.
CPC ........... *G07F 19/205* (2013.01); *E05G 1/024* (2013.01); *G06Q 20/1085* (2013.01)

(58) Field of Classification Search
CPC .... G07F 19/205; E05G 1/024; G06Q 20/1085
See application file for complete search history.

(56) References Cited

U.S. PATENT DOCUMENTS

| 4,048,926 A | * | 9/1977 | Brush, Jr. ............... E05G 1/024 109/65 |
|---|---|---|---|
| 7,156,297 B2 | | 1/2007 | McCracken et al. |
| 7,156,298 B2 | | 1/2007 | McCracken et al. |

* cited by examiner

*Primary Examiner* — John C Hong
(74) *Attorney, Agent, or Firm* — Ralph E. Jocke; Walker & Jocke

(57) ABSTRACT

A method of producing a secure chest adapted to hold cash dispensable from an automated banking machine, includes producing a wall panel. The wall panel includes a first wall liner that has a first planar portion and at least one first border wall that extends transverse to the first planar portion. The first planar portion and the at least one first border wall bound a pocket. With the first wall liner positioned in a first orientation, the method includes filling the pocket with flowable cement. Subsequent to filling the pocket with the cement, the method includes attaching the first wall liner and a second wall liner in fixed relation. Thereafter the wall panel is stored in the first orientation in which the cement at least partially hardens. Thereafter the wall panel is assembled in joined relation with at least one other wall panel to form the chest.

27 Claims, 34 Drawing Sheets

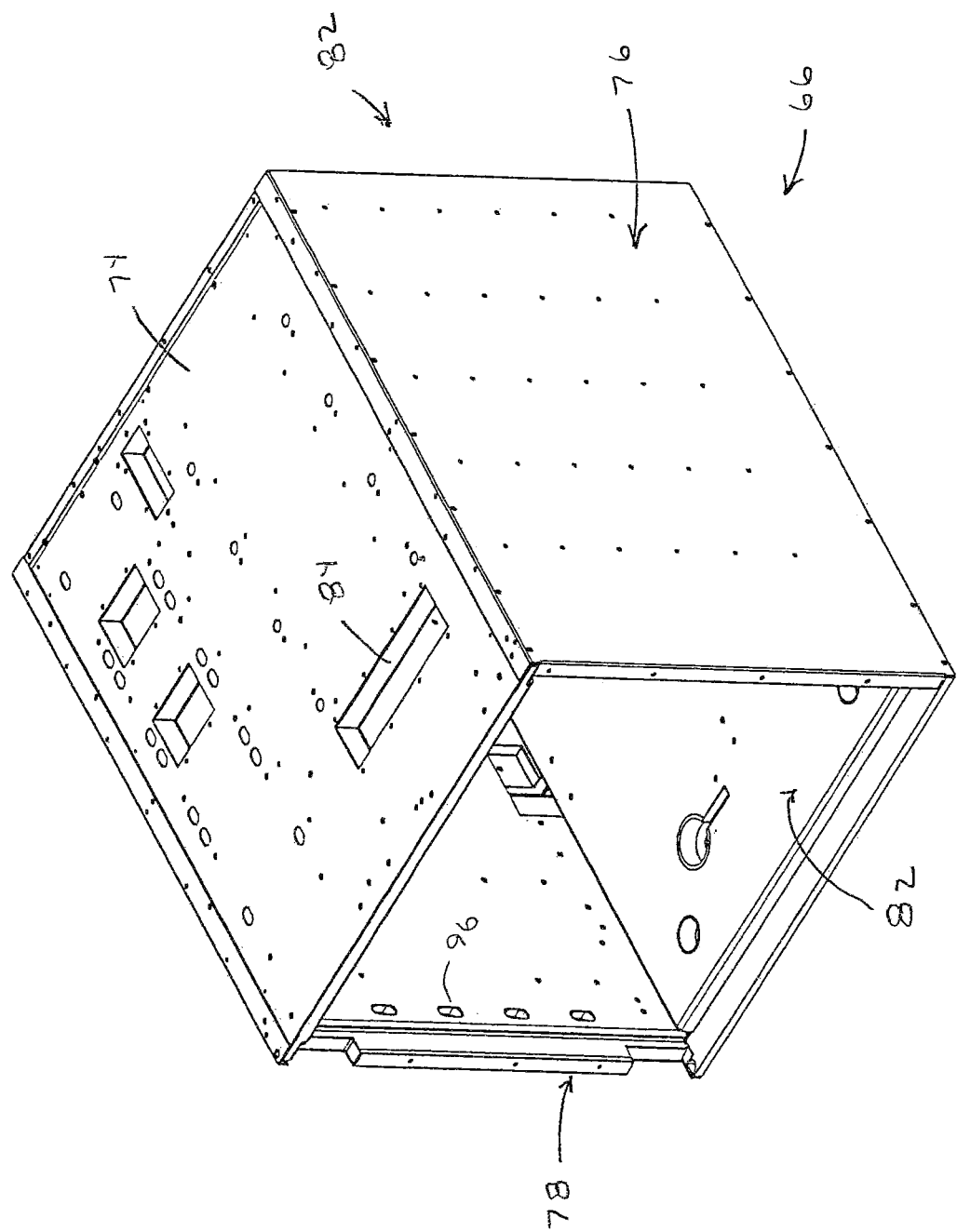

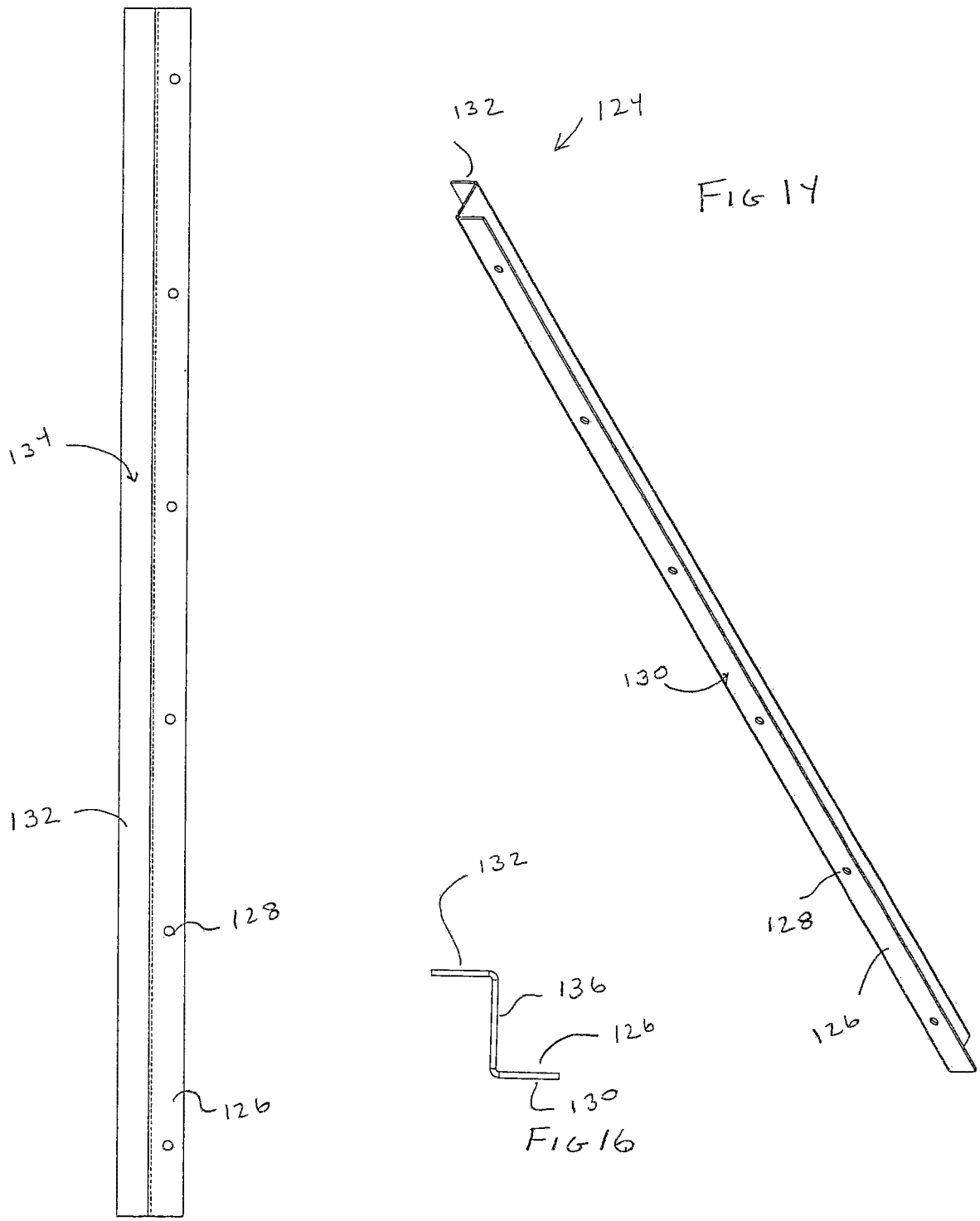

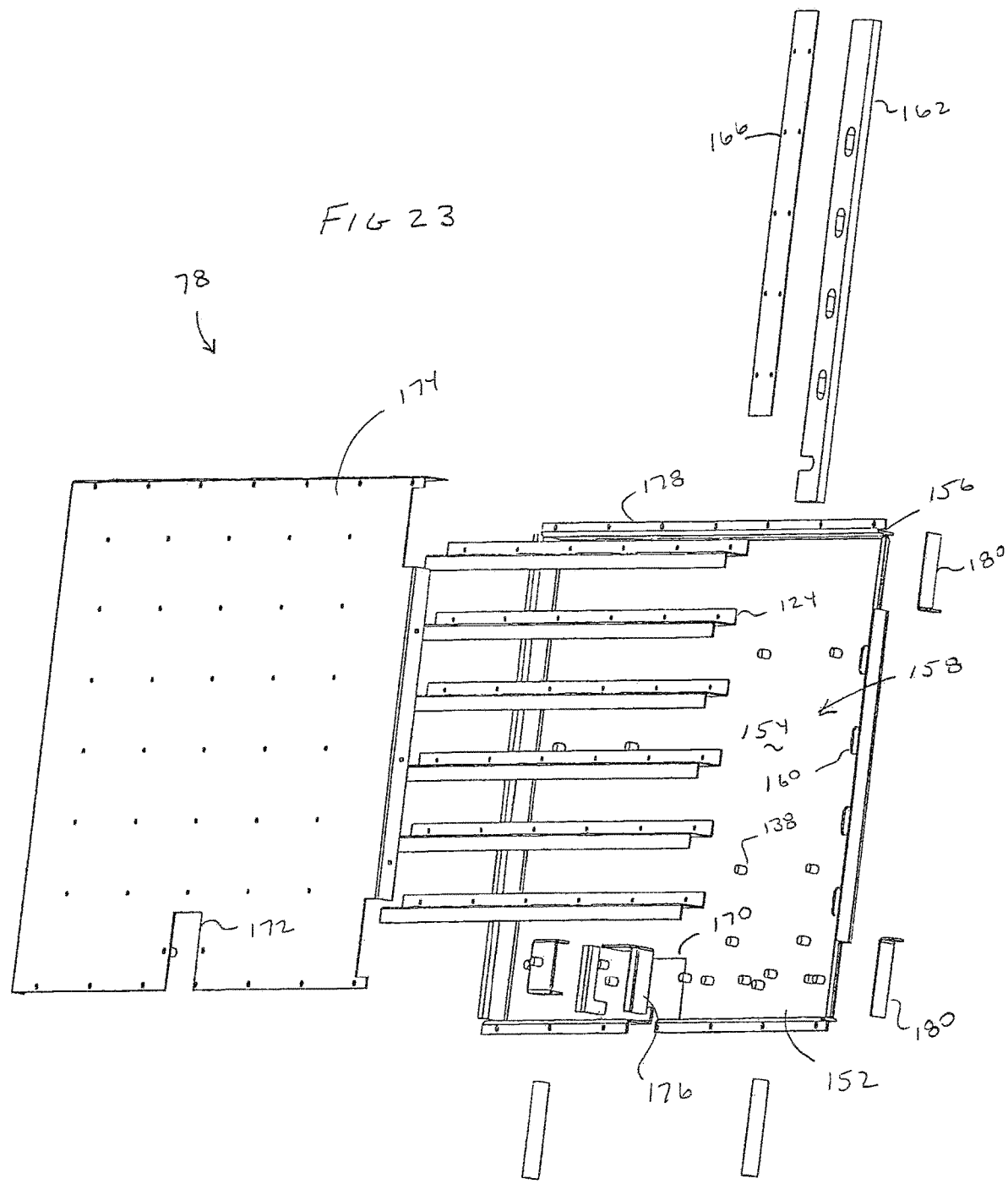

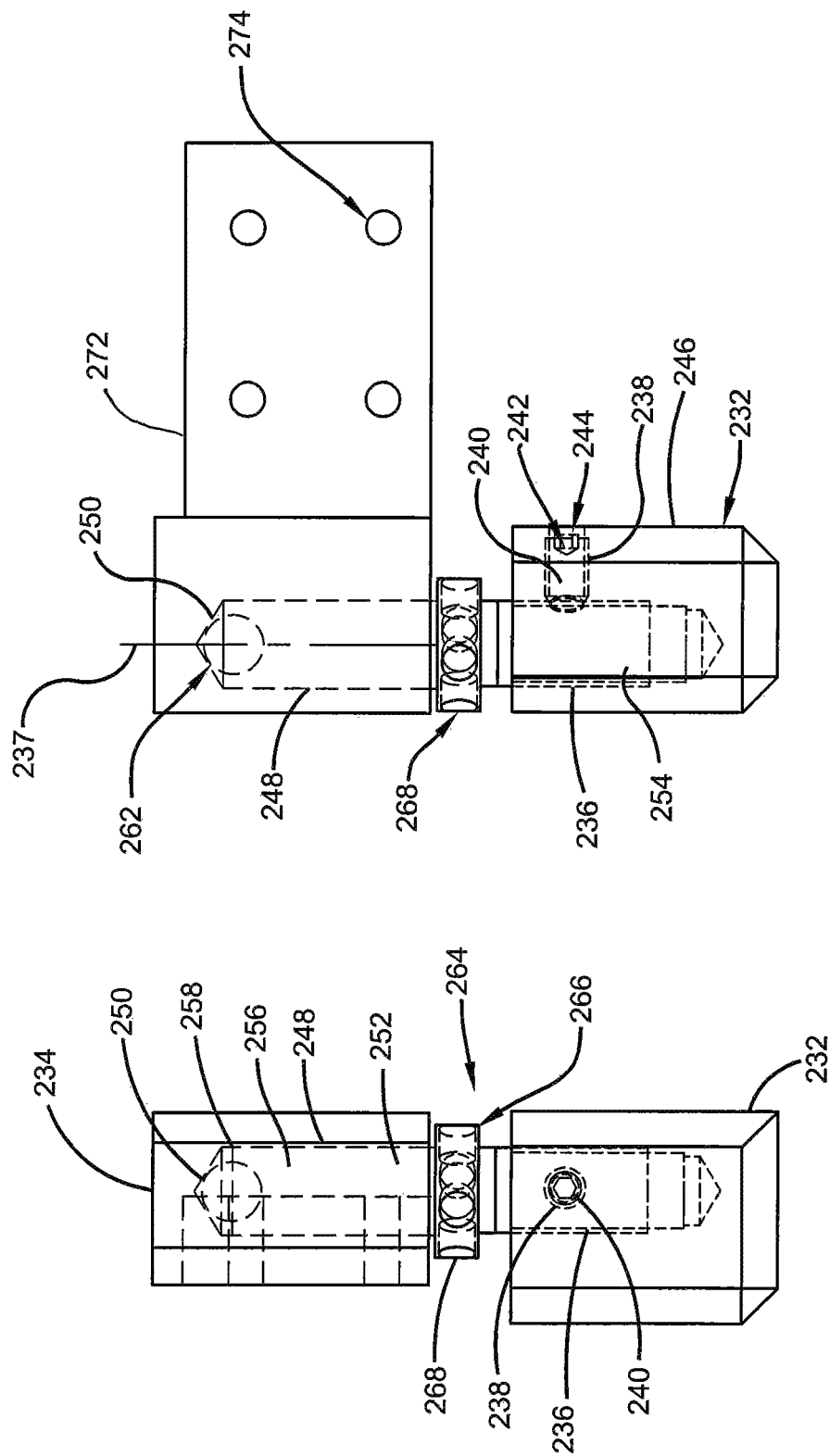

AUTOMATED BANKING MACHINE CONTROLLED RESPONSIVE TO DATA BEARING RECORDS WITH SECURE CHEST

TECHNICAL FIELD

Exemplary embodiments pertain to automated banking machines that are controlled responsive to data read from data bearing records such as user cards, and which dispense and/or receive documents such as currency bills and other records which may be classified in U.S. Class 235, Subclass 379, Group Art Unit 2876.

BACKGROUND

Automated banking machines may include a reader that operates to read data from a bearer record such as a user card. The automated banking machine may operate to cause the data read from the card or other record to be compared with computer stored data related to authorized users or accounts. The machine operates in response to the comparison determining that the bearer record corresponds to an authorized system user to carry out at least one transaction which is operative to transfer value to or from at least one account. A record of the transaction is also commonly produced and may be printed through operation of the automated banking machine and provided to the user. A common type of automated banking machine used by consumers is an automated teller machine which enables consumers to carry out banking transactions. Banking transactions carried out may include the dispensing of cash, the making of deposits, the transfer of funds between accounts and account balance inquiries. Some automated banking machines may additionally or alternatively optically scan and resolve data from documents such as financial checks. The types of transactions a customer may carry out with an automated banking machine are determined by the capabilities of the particular machine and the programming and systems associated with operation of the machine.

For purposes of this disclosure, an automated banking machine, an automated transaction machine, an automated teller machine or an ATM shall be deemed to include any machine that may be used to electronically carry out transactions involving automated transfers of value.

Automated banking machines may benefit from improvements.

SUMMARY OF DISCLOSURE

An automated banking machine that operates responsive at least in part to data read from data bearing records operates to cause financial transfers to or from financial accounts of machine users. The exemplary machine provides enhanced security to assure that cash and other valuables that are stored in the machine are securely stored. Some exemplary arrangements provide for an attack resistant secure chest for storage within the machine of cash or other valuable items.

Exemplary embodiments include a secure chest that is more efficiently manufactured and which can be utilized in numerous different configurations. Exemplary embodiments include methods of manufacture which can be carried out to produce secure chest structures of various configurations for use in connection with automated banking machines.

Further advantages of exemplary embodiments will be made apparent in the following detailed description of the exemplary embodiments and the appended claims.

BRIEF DESCRIPTION OF DRAWINGS

FIG. 7 is a perspective view of the secure chest without the door.

FIGS. 14-16 are views of an exemplary spacer bracket that is used in the exemplary wall panel.

FIG. 23 is an exploded view of components included in an exemplary hinge side wall panel of the secure chest.

FIG. 44 is a right side view of the exemplary hinge.

FIG. 45 is a front view of the exemplary hinge.

DETAILED DESCRIPTION OF EXEMPLARY EMBODIMENTS

Figure 1:
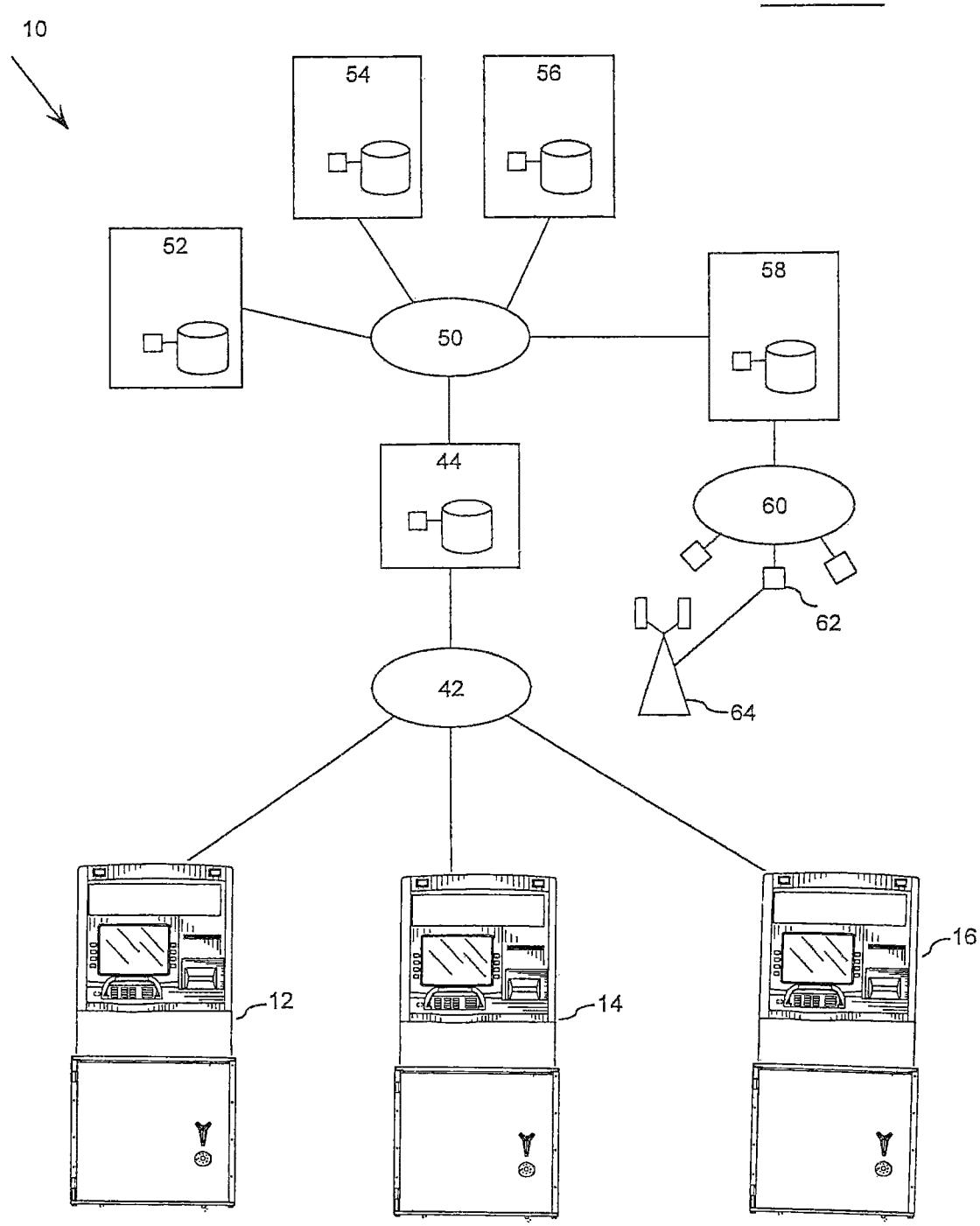
FIG. 1 is a schematic view of a system of an exemplary arrangement including automated banking machines that are operated in response to data read from data bearing records.

Referring now to the drawings and particularly to FIG. 1, there is shown therein an exemplary system generally indicated 10. System 10 includes a plurality of automated banking machines 12, 14 and 16. Each of the automated banking machines of the exemplary system is operative to cause financial transfers at least one of to or from user financial accounts, responsive at least in part to data read from data bearing records. It should be understood that these automated banking machines are exemplary and in other arrangements, other types of automated banking machines may be used.

Figure 2:
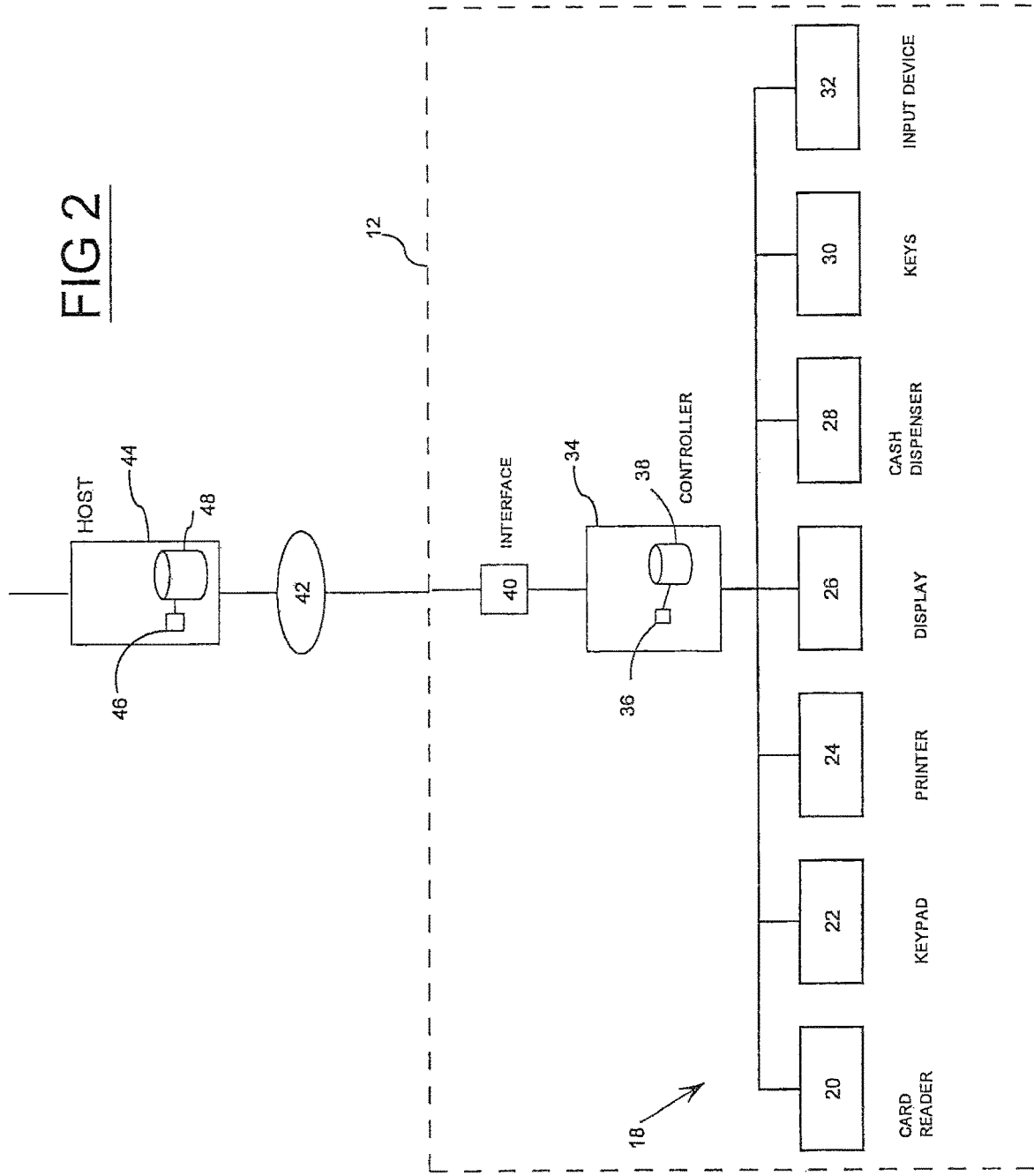
FIG. 2 is a schematic view of components included in the exemplary automated banking machine

The components of the exemplary automated banking machine 12 are shown schematically in FIG. 2. Automated banking machine 12 includes a plurality of transaction function devices 18. The exemplary transaction function devices in automated banking machine 12 include a card reader 20. Card reader 20 is operative to read data from bearer records including items such as user cards. The data read through operation of the card reader is usable to identify at least one of a user or a user financial account on which transactions at the machine are conducted. Exemplary arrangements may include magnetic stripe card readers, chip type card readers, wireless type card readers, bar code readers, wireless portals that communicate with mobile devices and other types of contact or non-contact devices for reading items which include or provide indicia that corresponds to users or user financial accounts.

The exemplary automated banking machine further includes a keypad 22. The exemplary machine includes a keypad having a plurality of manually actuatable keys that may be used by machine users to provide inputs. Inputs provided may include alphanumerical inputs, numerical inputs or other types of inputs as appropriate to be provided by users during operation of the machine. In exemplary embodiments, the keypad may include an encrypting keypad which includes internal circuitry operative to encrypt inputs that are provided by a user through contact with the keys.

The exemplary automated banking machine 12 further includes a printer 24. Printer 24 of the exemplary embodiment is operative to print paper documents for users of the machine. In some exemplary arrangements, the paper documents may include receipts for transactions conducted at the machine. In other exemplary arrangements, the printer may be operative to print other types of documents such as vouchers, scrip, checks, postage, or financial instruments. Various types of printers may be used in exemplary arrangements such as impact printers, dot matrix printers, thermal printers, laser printers or other suitable types of printers for producing the documents desired to be produced by the machine. It should be understood that in some exemplary arrangements multiple different types of printers, each of which produce different types of documents, may be included.

The exemplary automated banking machine further includes a display 26. Display 26 is operative to provide visual outputs to users of the machine. Visual outputs in exemplary embodiments may include instructions to users concerning operation of the machine. Displays used in some exemplary embodiments may include liquid crystal displays, CRT displays, OLED displays and other types of displays that are suitable for providing visual outputs to users.

The exemplary automated banking machine 12 further includes a cash dispenser 28. In some exemplary arrangements, the cash dispenser includes one or more mechanisms that are operative to make cash such as currency bills, coin or other currency items stored in a machine selectively available to users of the machine during the course of transactions. In some exemplary arrangements, cash dispensers may include mechanisms that operate to stack and then deliver a stack of currency bills to users.

In other arrangements, the cash dispenser 28 may include a currency recycling device. Such currency recycling devices may include devices that enable the machine to receive currency bills from users, to validate the received currency bills as genuine, and store such bills within the machine for later dispense to other authorized users.

The exemplary automated banking machine further includes a plurality of manually actuatable function keys 30. In some exemplary embodiments, the function keys may be disposed at locations adjacent to the display so as to enable users to manually actuate selected keys to select certain visual outputs that are provided through the display and to provide inputs to the machine. Alternatively other exemplary embodiments may include other types of keys for receiving inputs from users. Such keys may include other arrangements for manually actuatable keys such as a keyboard or other key arrangement. Further in some exemplary arrangements, the display may include a touchscreen type input device which may include visual representations of keys which can be selected by authorized users to provide inputs to the machine. Of course these types of keys are exemplary of input devices through which users may provide inputs to the machine.

The exemplary automated banking machine 12 further includes an input device 32. In some exemplary embodiments the input device includes a wireless portal that is suitable for receiving and communicating wireless signals. This may include, for example, communicating signals via radio frequency signals, infrared signals, or other signals that may be received from or communicated with portable devices such as smart phones. Further in other exemplary embodiments, other types of communication devices may be utilized for receiving inputs and providing outputs from the machine. This may include, for example, devices which are enabled to communicate wirelessly in wide area networks such as cellular communications networks or other suitable communications networks. Such devices may operate as readers in some exemplary embodiments.

The exemplary automated banking machine includes at least one controller 34 which is alternatively referred to herein as control circuitry. The exemplary controller includes one or more circuits which are operative to communicate with and control the operation of the transaction function devices 18. In the exemplary arrangement the at least one controller 34 includes at least one circuit including a processor or other similar device indicated 36 and at least one data store schematically indicated 38. In exemplary arrangements, the circuit may include a processor suitable for carrying out computer executable instructions that are stored in the one or more associated data stores. The processor may include or be in connection with a nonvolatile storage medium including instructions that include a basic input, output system (BIOS). Exemplary arrangements may include processors produced by Intel Corporation or other manufacturers. Of course it should be understood that this description of the controller is exemplary and in other embodiments, other arrangements may be used.

The exemplary data stores used in connection with exemplary automated banking machines may include any one or more of several types of mediums suitable for holding computer executable instructions. Such mediums may include, for example, magnetic media, optical media, solid state media, flash memory, computer hard drives, or other forms of media suitable for holding data and computer executable instructions. The exemplary controllers may include other components such as hardware and/or software interfaces for communication with transaction function devices.

The exemplary automated banking machine further includes at least one interface 40.

Interface 40 may include in some exemplary embodiments a suitable network interface that enables communication between the at least one controller of the automated banking machine and one or more networks schematically indicated 42. Interface 40 may include one or more circuits which include electrical components suitable to communicate with wired, optical or wireless networks as appropriate for purposes of providing communications with the machine.

As shown in FIGS. 1 and 2, the exemplary automated banking machine 12 may communicate through one or more networks 42 with one or more host computers schematically indicated 44. Host computer 44 includes at least one circuit including a processor schematically represented 46. The processor circuit 46 is in operative connection with at least one data store schematically indicated 48. The processor and data store associated with the host computer 44 is operative to carry out the computer executable instructions that are stored in the at least one data store.

As represented in FIG. 1, in an exemplary system arrangement, host computer 44 is in operative communication through one or more networks 50 with financial transaction servers 52, 54 and 56. Each of the servers 52, 54 and 56 each include at least one circuit including at least one processor and at least one associated data store as schematically shown.

In the exemplary arrangement, the system further includes at least one remote computer 58. The at least one remote computer 58 is operative to communicate with the system through network 50. The remote computer 58 includes at least one circuit including at least one processor and at least one data store as schematically shown. The exemplary remote computer 58 is also in operative connection with other networks such as network 60 which is schematically shown as well as other servers 62. In the exemplary arrangement the at least one remote computer may be in operative connection with one or more wireless communication networks 64. Such wireless communication networks may enable communication with automated banking machines that have wireless interfaces or other suitable systems to enable transactions to be conducted by messages communicated over wireless networks.

In operation of the exemplary arrangement, a user at an automated banking machine such as automated banking machine 12 is enabled to carry out transactions involving a user's financial account. This is accomplished in the exemplary arrangement by a user providing to the card reader of the machine or other suitable reading device, a suitable record such as a card or other item that includes readable indicia corresponding to data that is usable to identify at least one of a user or the financial account associated with the user. The controller 34 of the exemplary automated banking machine is operative in accordance with its programming to cause the reader to read data from the user card or other record. The controller further operates to cause the display to output indicia that prompts a user to input other identifying data to the machine such as a personal identification number (PIN) through the keypad 22 of the machine. The controller then operates to cause the user input PIN or other identifying data to be received through the keypad. Alternatively in some other arrangements, other or additional identifying data can be received through input devices of the machine, which data may be received through further inputs to the keypad. Alternatively in other arrangements, other or additional identifying data such as biometric data may be received. For example in some arrangements, the automated banking machine may include a transaction function device including a fingerprint reader, through which a user may provide fingerprint data to help identify the user as authorized to operate the machine. Alternatively or in addition, in other arrangements other types of biometric data or other identifying data may be input through input devices of the machine by a user. display to output messages to the user The exemplary controller 34 operates in accordance with its programming to cause the display to output messages to the user which prompt the user to provide inputs that correspond to the type of transaction they wish to conduct through operation of the machine. For purposes of this example, the user will select a cash dispense transaction which the user indicates by providing inputs by pressing appropriate keys 30 of the machine. In an exemplary arrangement in response to the user selecting a cash dispense transaction, the at least one controller operates to provide outputs through the display to the user, prompting the user to provide inputs corresponding to the amount of cash they wish to have dispensed in connection with the transaction. The controller then operates to cause the user input amount to be received as inputs through operation of the keypad 22 or other input device of the machine.

In response to receiving the input data from the user, the exemplary controller operates in accordance with its programming to cause one or more messages to be sent to the host 44. The messages sent to the host are transmitted through the network interface 40 and through the one or more networks 42 to the host include data corresponding to the inputs provided by the user to the machine.

In the exemplary arrangement, the host operates in accordance with its programming to determine if the data read from the user card corresponds to a user or a user financial account that is authorized to conduct a transaction at the machine. This is accomplished in the exemplary arrangement by the at least one circuit 46 of the host 44 determining if the card data corresponds to data stored in one or more data stores 48 associated with the host. In this exemplary arrangement if the data read from the user card corresponds to an account that is authorized to be used to conduct a transaction through operation of the machine, the host also determines if the customer's input PIN or other input identifying data corresponds to user identifying data associated with an authorized user of that particular account. This is accomplished by comparing data corresponding to the input PIN or other data, to data stored in the at least one data store 48. Thereafter if the PIN or other data that is input corresponds to the identifying data associated with the account, the host computer then operates in accordance with its programming to determine if the financial account of the machine user includes a balance that is at least equal to the amount that the user has requested to be dispensed from the automated banking machine. The exemplary host computer does this by comparing the financial account data stored in one or more data stores regarding the balance in the account and the amount requested by the machine user.

If the host computer determines that the card data and the input PIN or other identifying data are authorized and that the user's account has sufficient funds to enable the withdrawal of the amount requested, the host then operates in accordance with its programming to send one or more messages to the automated banking machine. The messages sent by the host computer are indicative that the transaction requested by the user has been authorized to be carried out. Of course it should be understood that in the event that the card data does not correspond to an authorized account for purposes of carrying out a transaction at the machine, or if the input PIN or other identification data is not appropriate for the particular account, then the host computer will send one or more messages to the machine to indicate that the transaction is not authorized. Likewise if the host computer determines that the user does not have a suitable balance in their account to cover the requested cash withdrawal, the host computer will likewise send one or more messages indicating that the transaction is not authorized. In cases where it is indicated that the transaction is not authorized, the at least one controller 36 operates in accordance with its programming to provide one or more outputs through the display 26 of the machine to indicate to the user that the transaction has been declined. The exemplary controller further operates in accordance with its programming to return the user's card to the user through operation of the machine if the user's card has been held therein. Thereafter, the machine returns to the waiting state to conduct another transaction that will start with the input of another card.

In exemplary arrangements if the one or more messages sent by the host to the automated banking machine indicate that the transaction is authorized, the at least one controller 34 operates in accordance with its programming to cause the cash dispenser to operate. The cash dispenser operates to make available to the user an amount of cash corresponding to the amount the user has requested. The exemplary controller may also operate in accordance with its programming to cause the printer 24 of the machine to operate to produce a receipt for the user which indicates the details of the transaction including the value of cash dispensed.

In the exemplary arrangement the controller 34 also operates to include one or more records in a data store 38 regarding the carrying out of the transaction and the fact that the cash was dispensed. Further the controller operates in accordance with its programming to send one or more messages to the host computer to indicate that the cash dispense was successfully carried out for the user. In response to the receipt of such messages, the exemplary host operates to assess a charge to the user's account corresponding to the value of the cash dispensed.

The exemplary process previously described may be utilized for authorizing transactions in situations where the host 44 has access to the data necessary to authorize financial transactions for the particular user at the machine. In some exemplary transactions, the host may not have direct access to the data associated with the particular user's account that is sufficient to authorize the user's requested transaction. In such arrangements, when the host receives the data related to the requested transaction, the host will operate in accordance with its programming to determine that it does not have the capability to determine whether the transaction requested should be authorized. In such arrangements, the host may operate in accordance with its programming to route the transaction data in one or more messages to the appropriate network such as network 50 which includes remote servers such as servers 52, 54 or 56 that can determine whether the transaction should be authorized.

In exemplary arrangements, the transaction data routed to the appropriate remote server is then analyzed in a manner similar to that previously described to determine if the card data corresponds to a user or an account that is authorized to conduct a transaction through operation of the machine and whether the input PIN or other customer identifying data corresponds to an authorized user of that account. Such appropriate remote server will also determine if the user has sufficient funds in the account to cover the requested cash withdrawal. The remote server then operates in accordance with its programming to communicate through the network 50 to the host 44, messages which include information on whether the transaction requested at the automated banking machine is to be authorized or denied. The host 44 then communicates the appropriate messages to the machine. If the transaction is authorized, the machine operates to carry out the cash dispensing transaction. The transaction is successfully carried out by dispensing the requested cash. The machine communicates messages to the host indicative of the successful completion of the transaction. The host 44 then communicates this information through the one or more networks 50 to the appropriate remote server. The server then causes the user's account to be assessed an amount corresponding to the value of the cash dispensed.

It should be understood that the approaches described are exemplary. Other types of transactions, such as deposit transactions, account balance inquiries, check deposit transactions, check cashing transactions, cash accepting transactions and other types of transactions may be conducted in exemplary embodiments through communication with various appropriate systems as necessary to authorize and complete the transactions.

Figure 3:
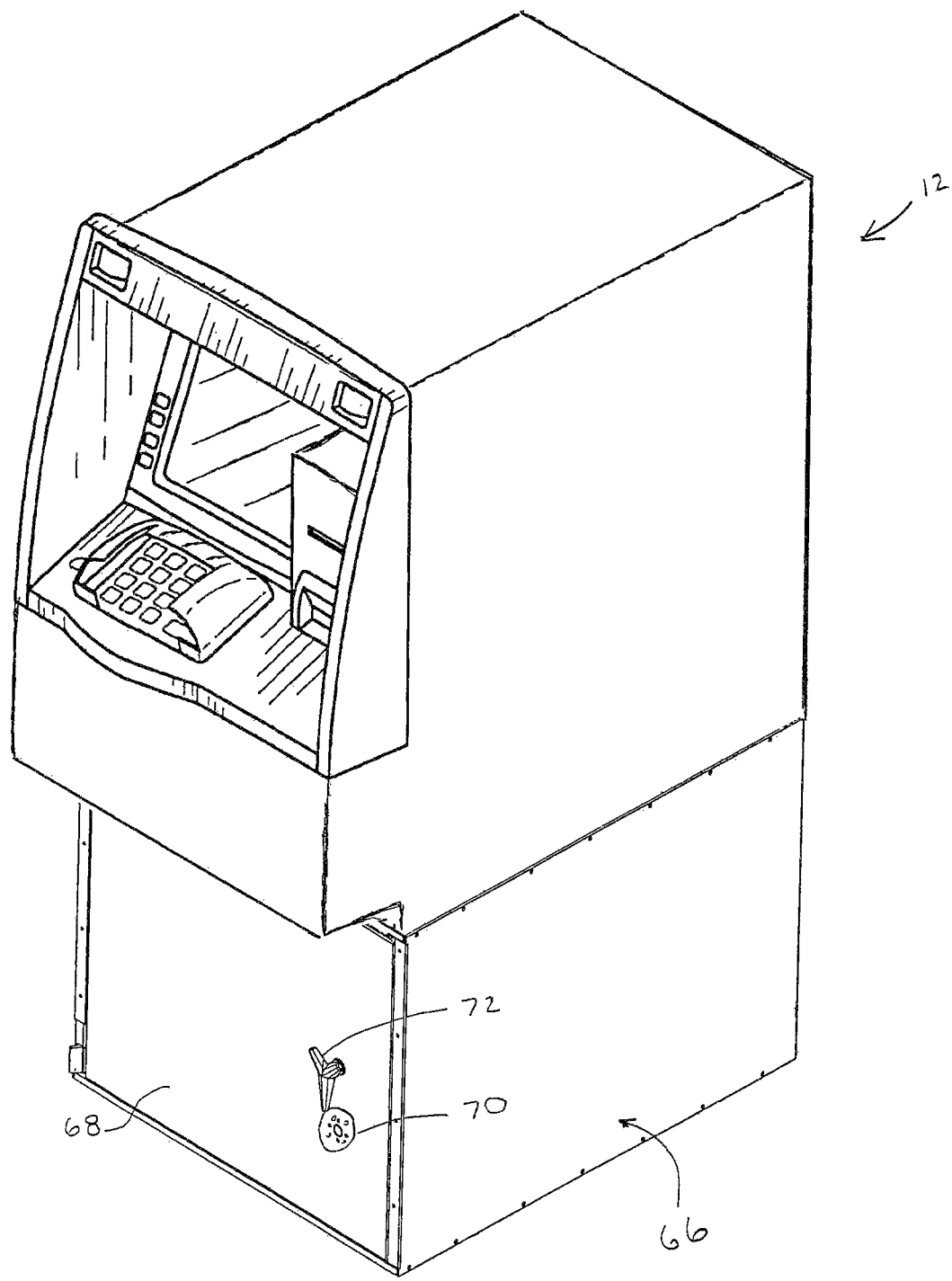
FIG. 3 is a perspective view of an exemplary automated banking machine including a secure chest which is utilized for storing valuable items that are dispensed from or received by the machine.
Figure 4:
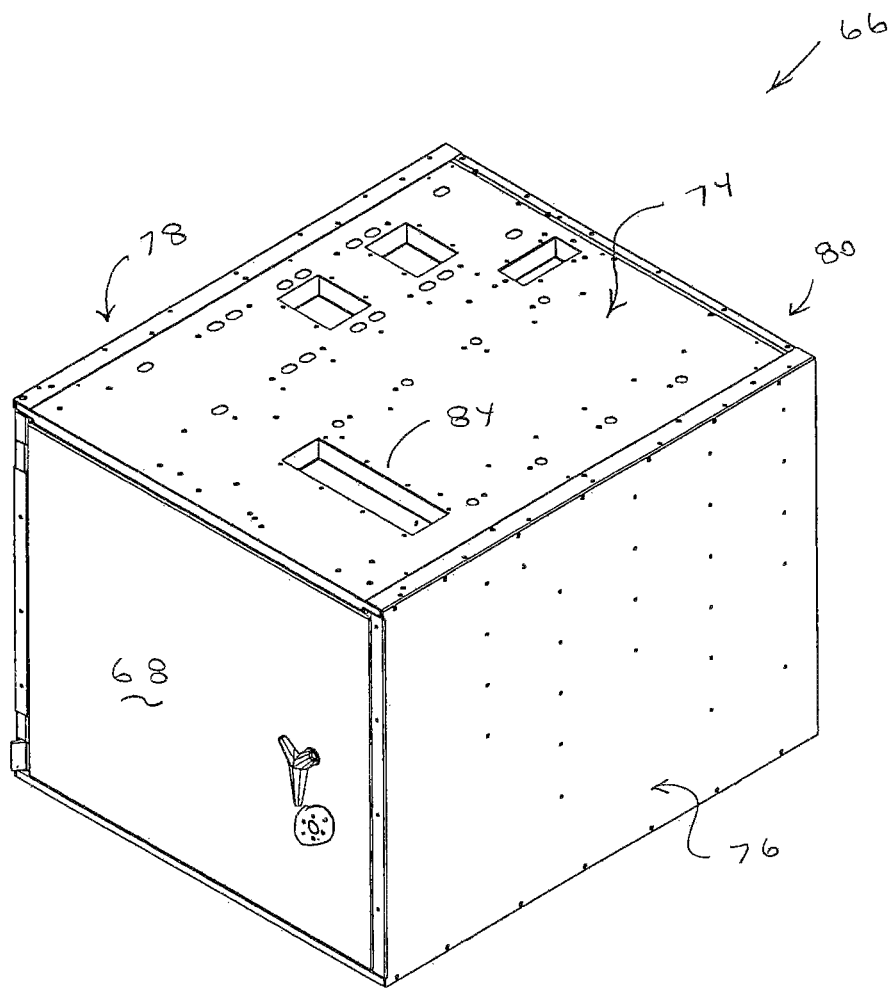
FIG. 4 is a perspective view of an exemplary secure chest.
Figure 5:
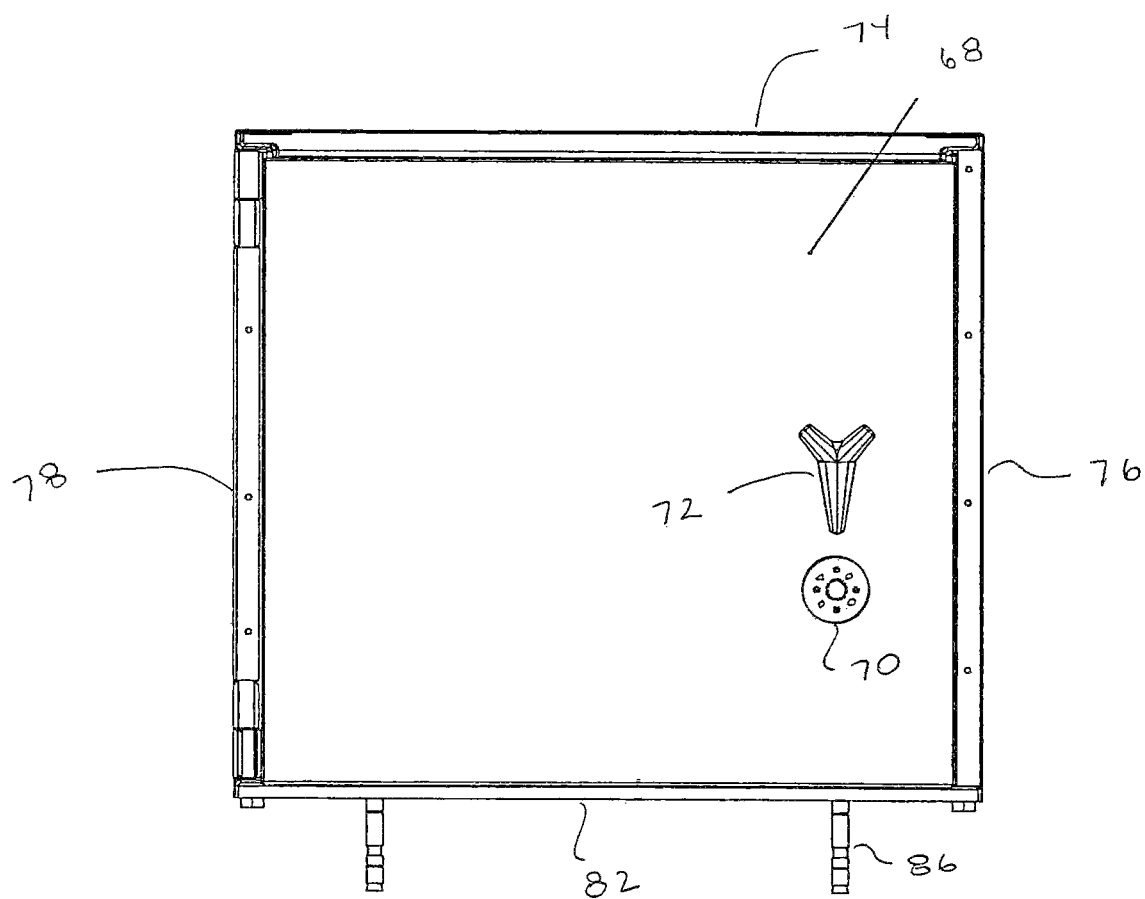
FIG. 5 is a front view of the exemplary secure chest including a chest door thereof.

As shown in FIG. 3, the exemplary automated banking machine 12 includes a secure chest 66. Chest 66 is a secure enclosure in which cash and other documents or things of value that are dispensed from or received by the machine are stored. In exemplary embodiments a portion of the cash dispenser such as cash holding cassettes are positioned within the chest. The exemplary chest includes a chest door 68. The chest door is selectively movable in operative connection with the chest between open and closed positions so as to enable authorized persons to gain access to the interior area of the chest 66. The exemplary chest door 68 has a lock 70 associated therewith. The lock 70 is usable to receive inputs such as an appropriate combination that unlocks the lock and enables a user to turn a handle 72 that changes the door from the latched to an unlatched condition in which the door may be opened. As shown in FIGS. 4 and 5, chest 66 is comprised of a plurality of wall panels. In the exemplary arrangement, the chest includes a top side wall panel 74, a lock side wall panel 76, a hinge side wall panel 78, a back side wall panel 80 and a bottom side wall panel 82.

As represented in FIG. 4, wall panels such as top side wall panel 74 may include one or more panel openings 84 therethrough. Wall panel openings are used in exemplary embodiments to provide access through the wall panel to the interior of the chest. In some exemplary arrangements, the panel openings may be used to pass items such as currency bills or other documents or things from the inside to the outside of the chest and vice versa. In other arrangements, the panel openings may be utilized to provide access for wiring, heating or cooling ducts or other components that extend between the inside and the outside of the chest. As shown in FIG. 5, the exemplary chest may also include structures which accept suitable anchors 86 or similar structures that can be used for purposes of attaching and securing the chest portion of the machine to a floor or other adjacent structures. Of course this approach is exemplary and in other embodiments, other approaches may be used.

Figure 6:
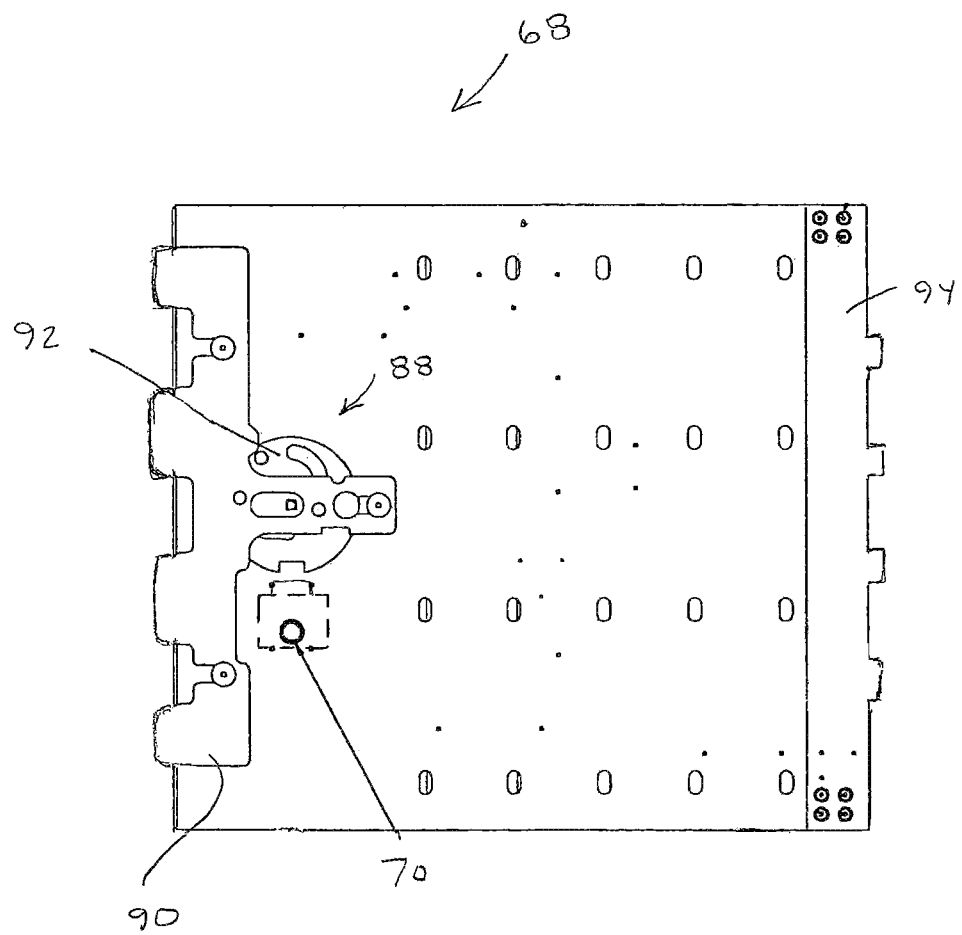
FIG. 6 is a back view of an exemplary chest door.
Figure 9:
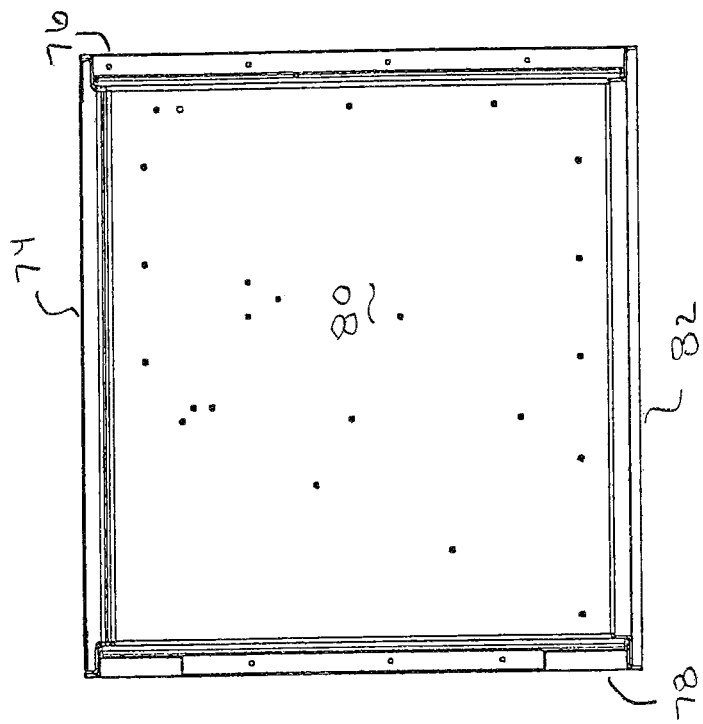
FIG. 9 is a front view of the secure chest without the chest door
Figure 8:
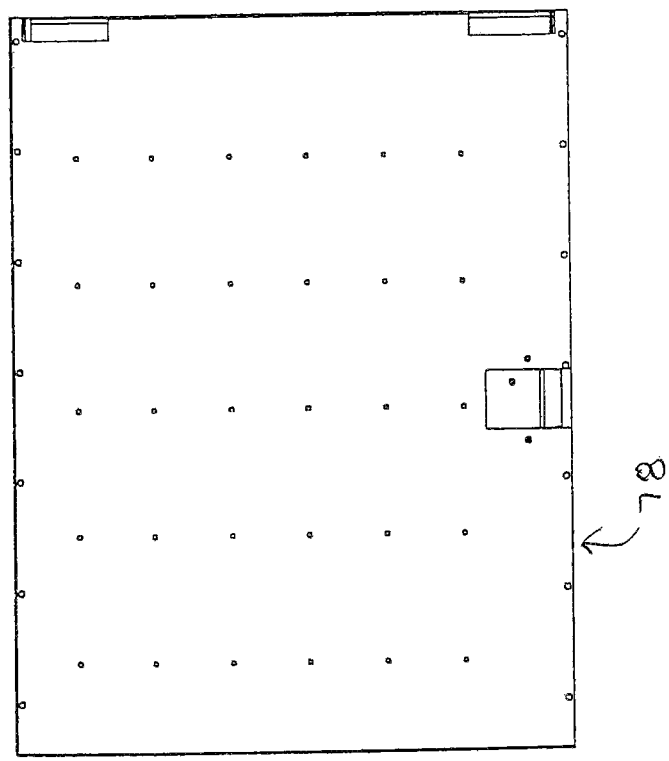
FIG. 8 is a plan view of the hinge side of the secure chest.
Figure 11:
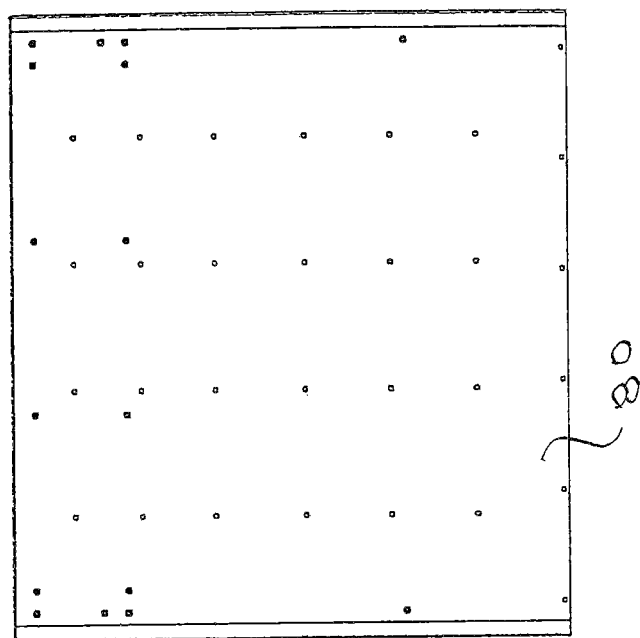
FIG. 11 is a plan view of the back side of the exemplary secure chest.
Figure 10:
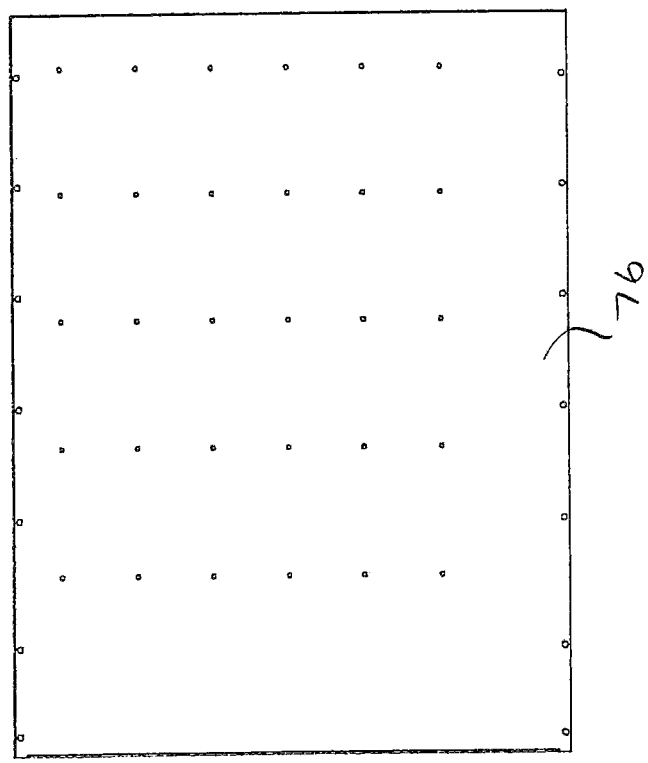
FIG. 10 is a plan view of the lock side of the exemplary secure chest.
Figure 12:
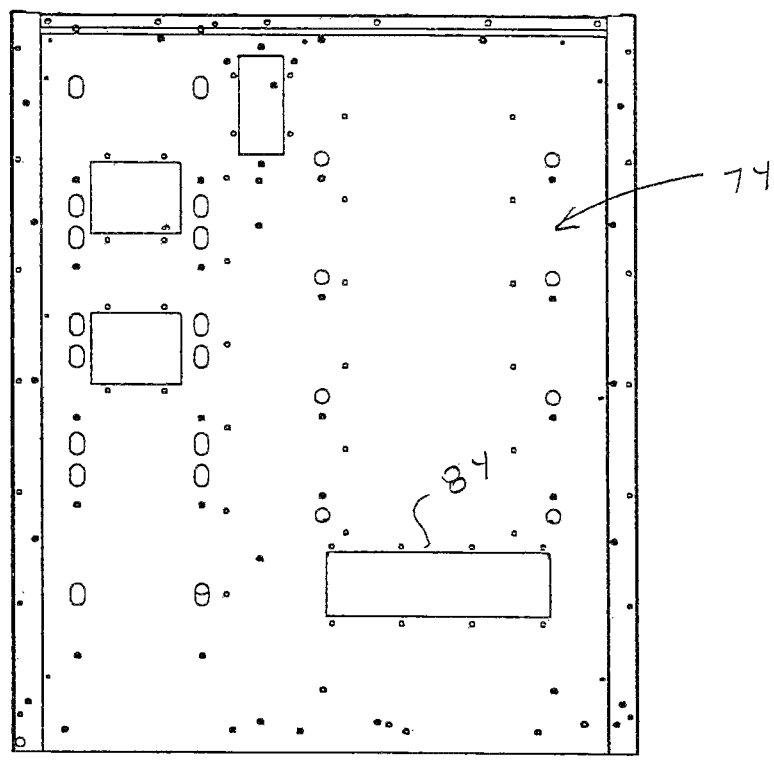
FIG. 12 is a plan view of the top side of the exemplary secure chest.

FIG. 6 shows the inside face of the exemplary chest door 68. The exemplary chest door includes a boltwork. The exemplary boltwork includes a bolt 90. Bolt 90 includes projections thereon and is movable in the unlocked position of the lock 70 between extended and retracted positions. In the unlocked position of the lock, rotation of the handle 72 causes rotation of a drive member 92 that is operative to move the bolt 90 through a cam arrangement. In the locked condition of the lock 70, the lock holds the drive member 90 in fixed engagement with the bolt extended. The bolt in the extended position has the projections thereof engaged with a strike which includes a plurality of apertures in the lock side wall panel of the safe as later discussed. When the lock 70 is unlocked, the handle 72 is enabled to move the drive member so as to retract the bolt such that the projections thereon are retracted from and out of engagement with the apertures in the lock side wall panel, thus enabling the door to be opened.

The exemplary chest door 78 further includes a deadbolt 94. The deadbolt of the exemplary arrangement is positioned on the hinge side of the chest door 68. The deadbolt 94 includes a plurality of deadbolt projections. The deadbolt projections in the closed position of the chest door 68 engage in apertures 96 in the hinge side wall panel of the chest as shown in FIG. 7. Thus as can be appreciated, in the closed position of the chest door 68 both the projections on the bolt 90 and on the deadbolt 94 help to hold the chest door in the closed position, blocking access to the interior area of the chest 66. Of course it should be understood that these approaches are exemplary and in other embodiments other approaches may be used.

In exemplary embodiments, the secure chest 66 is comprised of wall panels that provide enhanced resistance to attack. This is accomplished by having the wall panels comprised of both metal bounding structures and reinforcing components, as well as internal hardened cement which is generally surrounded by the metal structures of the wall panel. By providing the panel structure including the metal reinforcement and cement hardened constituents, attempts at cutting, drilling, sawing or otherwise attempting to access the interior area of the secure chest is strongly resisted, such that attempts to compromise the chest and access the valuables stored therein are successfully resisted. The makeup of the exemplary wall panels used in the exemplary secure chest and the method of making such wall panels in an exemplary embodiment is now explained with reference to FIGS. 13-38.

Figure 13:
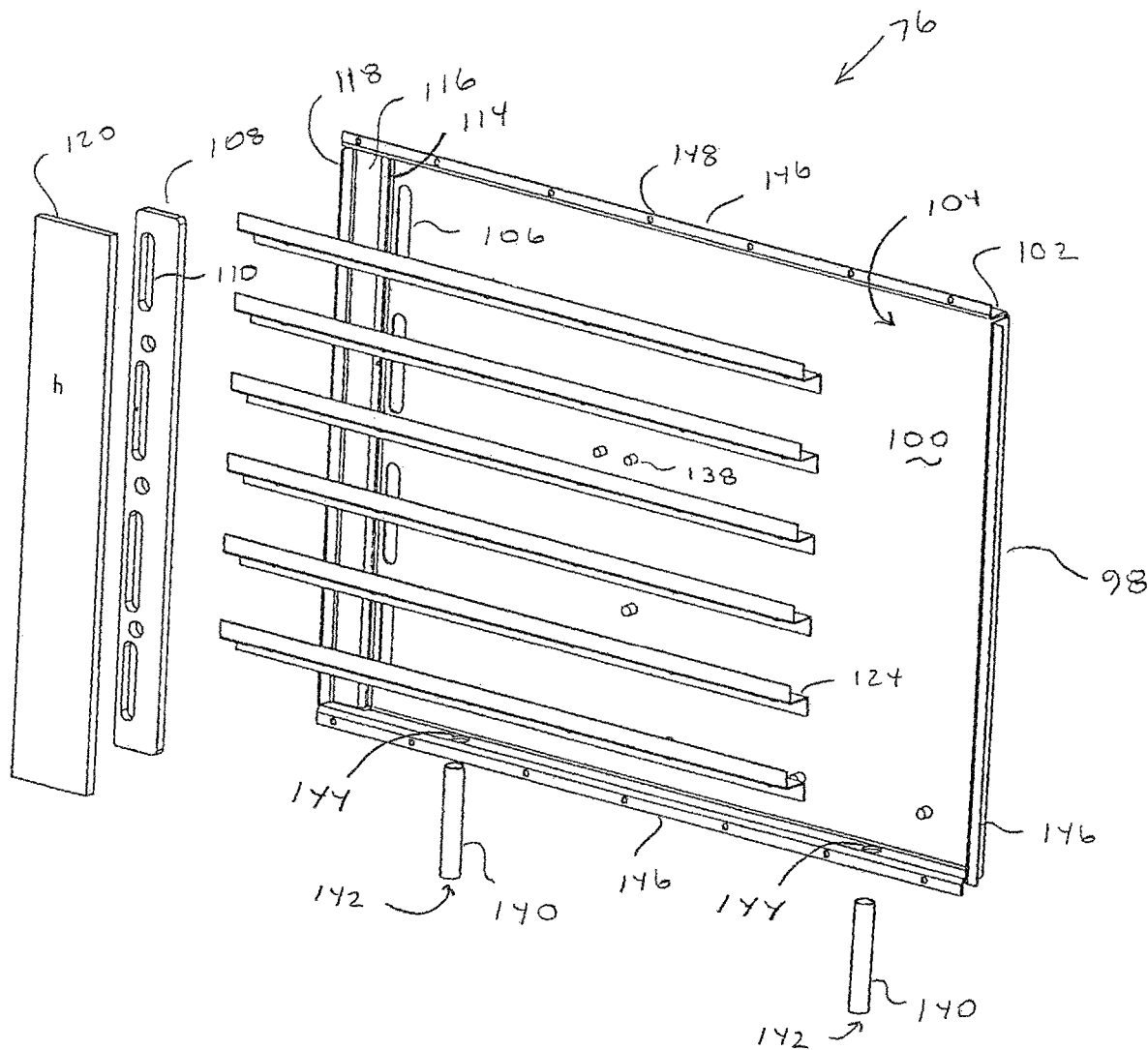
FIG. 13 is an exploded view of components which are included in a lock side wall panel of the exemplary chest.

The exemplary lock side wall panel 76 includes an inner wall liner 98 as shown in FIG. 13. Inner wall liner 98 of the exemplary embodiment is a formed sheet metal component that includes certain useful features. In the exemplary embodiment, inner wall liner 98 includes a generally flat planar portion 100. Planar portion 100 is generally flat both on the inside surface which faces the interior area of the chest, as well as the opposed surface which faces the inside of the lock side wall panel. In the exemplary embodiment, the planar portion 100 is bounded by a border wall 102. The border wall 102 in the exemplary arrangement includes four walls that extend transversely to the planar portion 100. The border wall 102 bounds a pocket 104 which in the exemplary embodiment is used to contain a flowable cement later discussed which hardens as it cures. In the exemplary arrangement when the planar portion 100 is positioned in an orientation where the planar portion is horizontal, the border wall 102 extends generally upward so as to bound the pocket 104 and contain the cement within the pocket. In exemplary arrangements where the border wall is formed from turned portions of the metal sheet which makes up the inner wall liner 98, the corners can be welded or otherwise closed to prevent the escape of the cement material from the pocket before it hardens.

In the exemplary arrangement, the inner wall liner 98 of the lock side wall panel 76 includes a plurality of bolt accepting liner apertures 106 therein. Liner apertures 106 are configured to accept projections on the bolt 90 therein when the bolt is in an extended and locked position. In the exemplary embodiment, a reinforcing plate 108 shown in FIG. 19 includes a plurality of reinforcing plate apertures 110 therein. The reinforcing plate apertures 110 correspond in configuration to the liner plate apertures 106. The reinforcing plate apertures are configured to accept the extended projections of the bolt therein. The reinforcing plate 108 provides additional strength that resists deformation and removal of the chest door 68 such as during an attack. The exemplary reinforcing plate 108 further includes a plurality of holes 112 therein.

Figure 17:
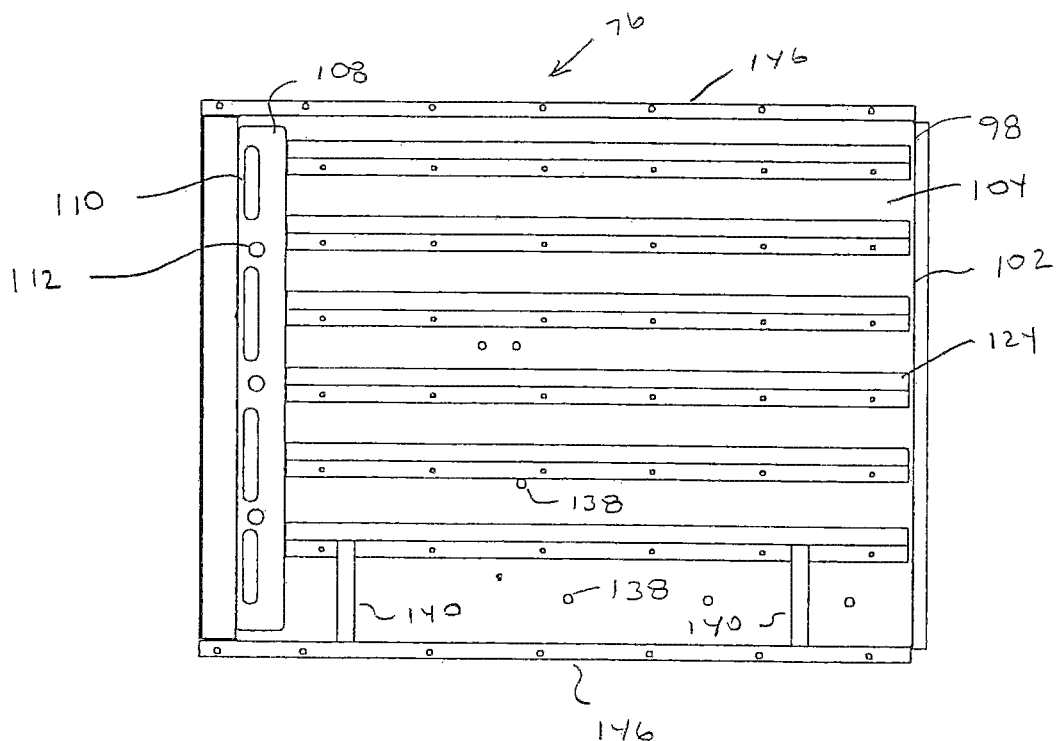
FIG. 17 is a top plan view of the lock side wall panel with a reinforcing plate, support leg acceptor tubes and elongated bracket spacers installed.
Figure 19:
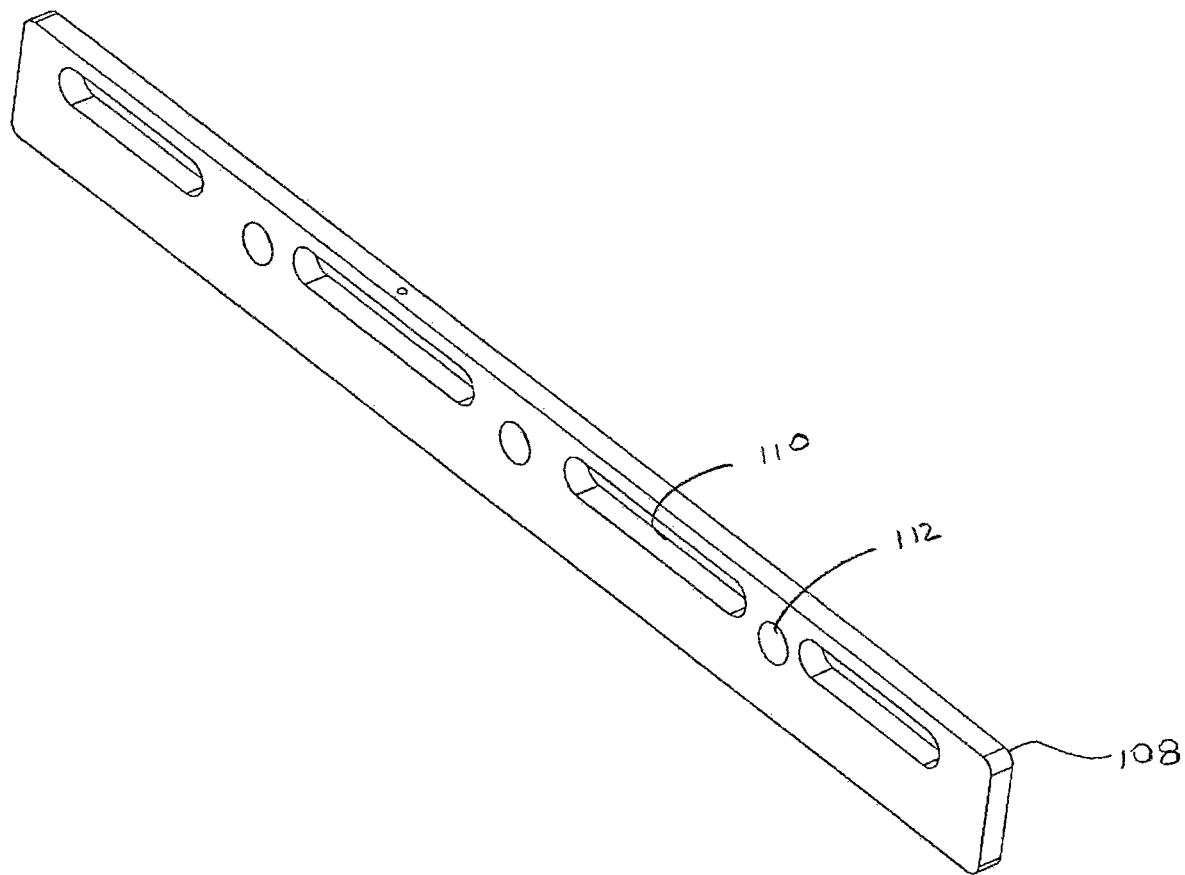
FIG. 19 is a perspective view of an exemplary reinforcing plate.
Figure 20:
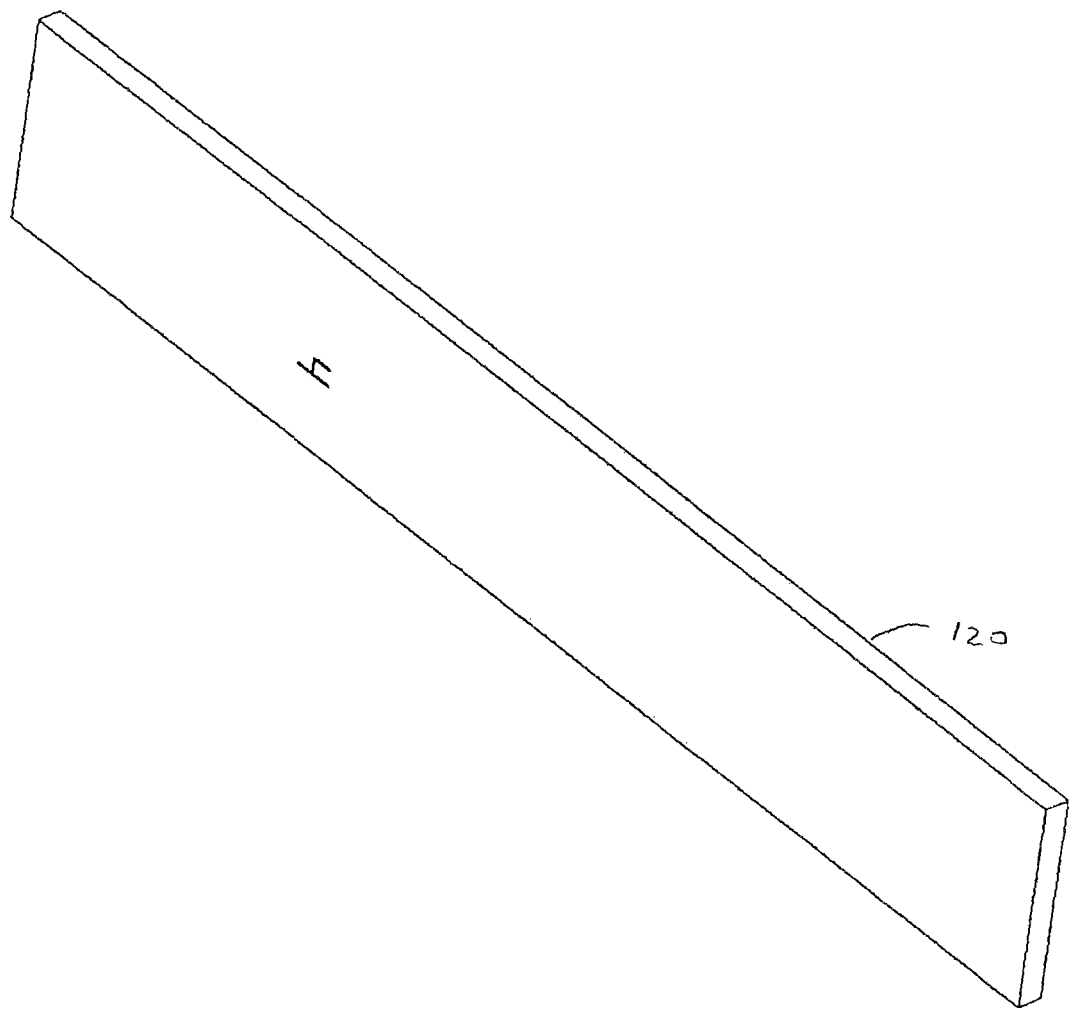
FIG. 20 is a perspective view of an exemplary overlying security plate.

As represented in FIG. 17, the exemplary reinforcing plate 108 is positioned in the pocket 104 adjacent to the liner apertures 106 and in aligned relation therewith. In the exemplary arrangement, the reinforcing plate may be attached in fixed relation to the planar portion by plug welding in the holes 112. Alternatively or in addition the reinforcing plate may be attached by plug welding in openings in the inner wall liner, or both. Of course this approach to attachment of the reinforcing plate is exemplary and in other embodiments, other approaches may be used. In the exemplary arrangement, the reinforcing plate is positioned in abutting relation with an in turned step 114 formed in the inner wall liner 98 which extends adjacent to the liner apertures 106. A shelf portion 116 extends forwardly relative to the wall liner 98 of the in turned step and terminates in a lip 118. Lip 118 and the shelf portion 116 is configured to accept in engagement therewith a hardened metal security plate 120. The hardened metal security plate 120 of an exemplary embodiment is shown in FIG. 20. The plate is comprised of hardened steel material that is configured to resist drilling, cutting or other attack methods in the area of the bolt.

Figure 18:
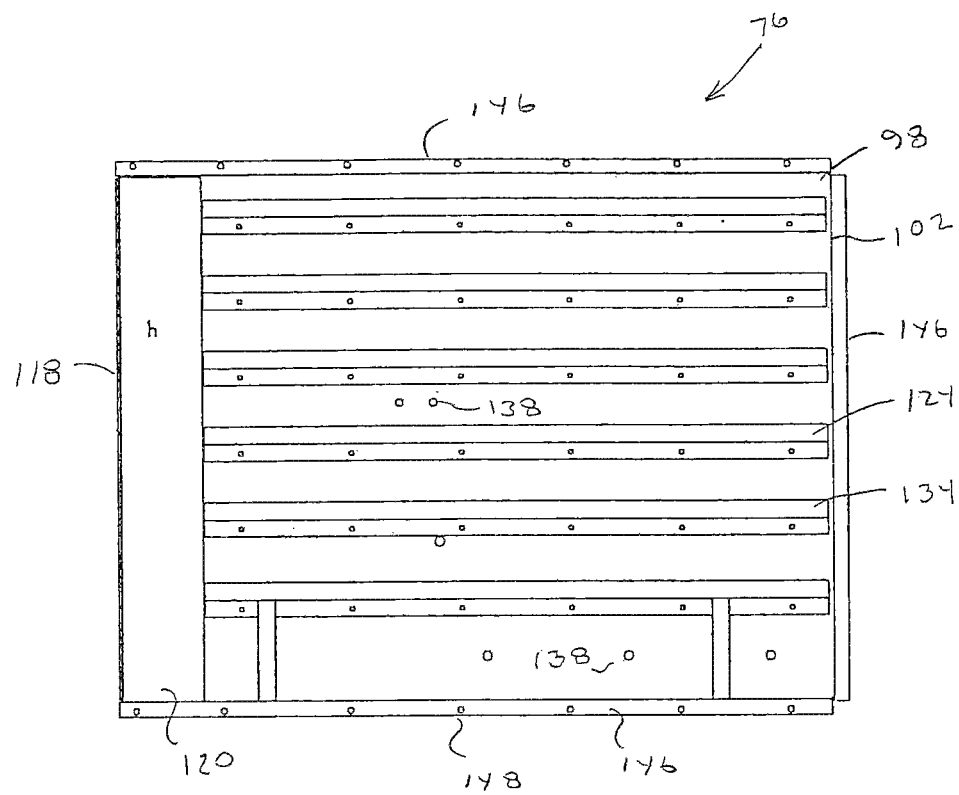
FIG. 18 is a view similar to FIG. 17 after installation of a security plate above the reinforcing plate.

As represented in FIG. 18, the exemplary hardened metal security plate 120 is configured to extend in overlying outward relation of the reinforcing plate apertures 110. Thus as can be appreciated, in the exemplary embodiment the hardened metal plate extends between an outer wall liner 122 shown in FIG. 21, which is attached to the inner wall liner 98 when the panel is assembled, and the apertures into which the projections on the bolt extend when the bolt is in the locked position. This further helps to provide enhanced security.

As shown in FIG. 13 in the exemplary embodiment, the inner wall liner has attached thereto a plurality of spacers in the form of elongated brackets 124. The exemplary elongated brackets are shown in FIGS. 14-16. In the exemplary arrangement, elongated brackets 124 include a leg 126. Leg 126 includes a plurality of holes 128 therein. A first side 130 of the lower leg 126 is configured to engage planar portion 100 of the inner wall panel in the operative position.

The elongated bracket 124 further includes an upper leg 132. The upper leg 132 in the exemplary embodiment extends parallel to the lower leg 130. The upper leg 132 includes a side face 134. The side face 134 is configured to be in abutting engagement with the inner face of the outer wall liner 122 when the inner wall liner 98 and the outer wall liner 122 are engaged to form the panel 76.

An intermediate web 136 extends in cross section between the upper leg 132 and the lower leg 126 of the elongated bracket 124. As can be appreciated, the height of the web 136 corresponds to the desired thickness within the pocket 104 of the cement material and serves to position the overlying outer wall liner 122 in the appropriately desired position. In the exemplary embodiment, each of the elongated brackets 124 is held in attached relation to the planar portion by plug welding in each of the holes 128. Of course it should be understood that this approach is exemplary and in other embodiments, other attachment approaches may be used.

In the exemplary embodiment, the inner wall liner prior to the introduction of the flowable cement material, has positioned therein, spacers in the form of spacer blocks 138. The spacer blocks 138 in the exemplary inner wall liner 98 are cylindrical blocks. However, in other arrangements, other configurations of spacer blocks may be used. In exemplary embodiments, the spacer blocks include a first face that is in abutting engagement with the planar portion 100 of the inner wall liner. The spacer blocks may be attached in fixed engagement with the inner wall liner by plug welding in a hole in the inner wall liner at the location of the spacer block or through other attachment methods. Each spacer block also includes a second surface disposed from the planar portion. In exemplary embodiments, a second surface of each spacer block is disposed at the same level as the side face 134 of the elongated spacer brackets 124. In exemplary embodiments, the spacer blocks may be utilized to provide additional support and integrity to the wall panel structure. The spacer blocks may also provide threaded mounting openings on the inner wall liner. Of course it should be understood that this approach is exemplary and in other embodiments, other approaches maybe used.

In the exemplary method of manufacture, the flat side wall panel 76 prior to being filled with the flowable cement, has a pair of support leg accepting tubes 140 is positioned therein.

The support leg accepting tubes each include a leg accepting tube opening 142 at an end thereof. Each leg accepting tube opening 142 is positioned in alignment with a border wall opening 144. The exemplary support leg accepting tubes are configured to accept a stem of a support leg therein. In some exemplary arrangements, the interior of the support leg accepting tubes may be threaded or otherwise configured so that the support leg may be positioned so as to selectively extend outward from the tube. In this manner, the position of the support leg may be adjusted so as to level the automated banking machine on a support surface. Of course it should be understood that this approach is exemplary and in other embodiments, other attachment approaches may be used.

In an exemplary embodiment, the inner wall liner 98 includes a plurality of flange portions 146. The exemplary flange portions extend in the exemplary embodiment from the top of the border wall 102 away from the planar portion. The flange portions 146 extend away from the pocket 104. In the exemplary embodiment, some of the flange portions 146 include holes 148. In exemplary embodiments, the holes 148 can be used to attach the outer wall liner 122 to the inner wall liner in fixed engagement. This may be done for example by plug welding in the holes. Of course it should be understood that in other embodiments, other approaches may be used.

In an exemplary embodiment the lock side wall panel 76 is made by forming the inner wall liner 98 from one or more sheets of appropriate metal material such as a formable steel plate. The spacers including the elongated brackets 124 and spacer blocks 138 are attached to the wall liner in the appropriate positions in the manner previously discussed. Likewise the reinforcing plate 108 and the hardened metal plate 120 are installed in fixed connection with the inner wall liner 98. The support leg accepting tubes 140 are also installed in engagement with the inner wall liner such as by welding either to the liner or to one or more spacer supports.

Once the metal structures are attached to the inner wall liner, the pocket area within the border wall 102 is filled with a flowable cement. This is done with the flat panel in an orientation where the planar portion extends generally horizontally and the flowable cement is contained within the pocket 104 by the border wall 102. The flowable cement is deposited throughout the pocket area between the spacers and other structures therein. As can be appreciated in the exemplary lock side panel 76, the pocket extends to the reinforcing plate 108 which is maintained free of the flowable concrete material.

In the exemplary embodiment, the process of filling the pocket with the flowable cement includes spreading the cement uniformly within the pocket so that it extends generally to the level of the upper faces of the spacers such as generally the level with face 134 of the elongated brackets 124 and the top of the spacer blocks 138. In the exemplary embodiment the upper faces of the spaces are wiped to be free of the cement to facilitate attaching the outer wall liner thereto such as by welding.

In the exemplary embodiment, the cement material may include material such as SpecChem Multipurpose Grout-IL which is produced by SpecChem, Inc. of Kansas City, Mo. Of course in other embodiments other types of cement which harden upon curing, may be used. Further in other exemplary embodiments the flowable cement may include numerous different materials that are tailored for resisting attacks through different types of attack methods. These may include, for example, the inclusion of certain hardened particles such as carbides, diamonds or alumina to resist abrasive type cutting. Also in some exemplary arrangements, soft material such as brass or other items may be utilized for purposes of galling or otherwise fouling cutting tools that may be used to attack the material. Numerous different types of approaches may be taken depending on the attack resistance desired. Further in exemplary arrangements, the pocket or the surfaces bounding the pocket may include conductive electrical traces or other suitable elements for detecting when an attack has caused a break in the traces due to a breach in the integrity of the panel. Of course it should be understood that these approaches are exemplary and in other embodiments, other approaches may be used.

Figure 21:
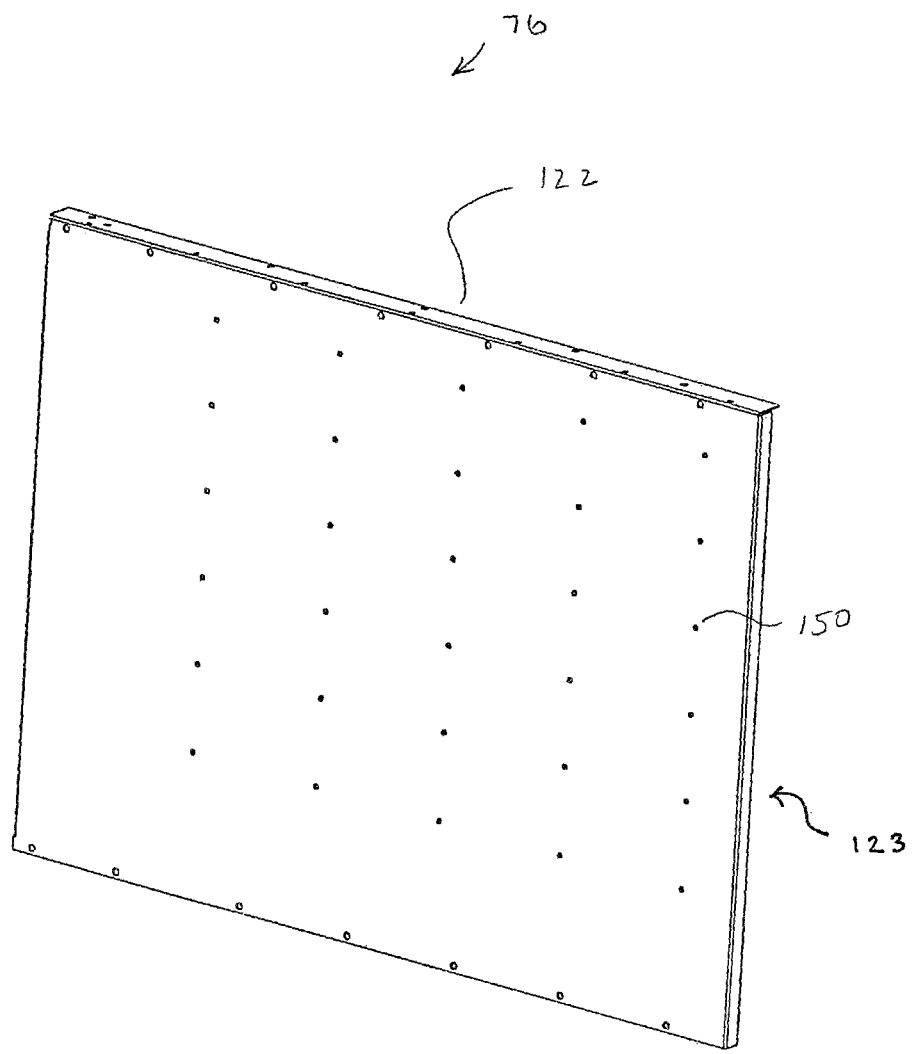
FIG. 21 is a perspective view of an exemplary outer wall liner of the lock side wall panel.
Figure 22:
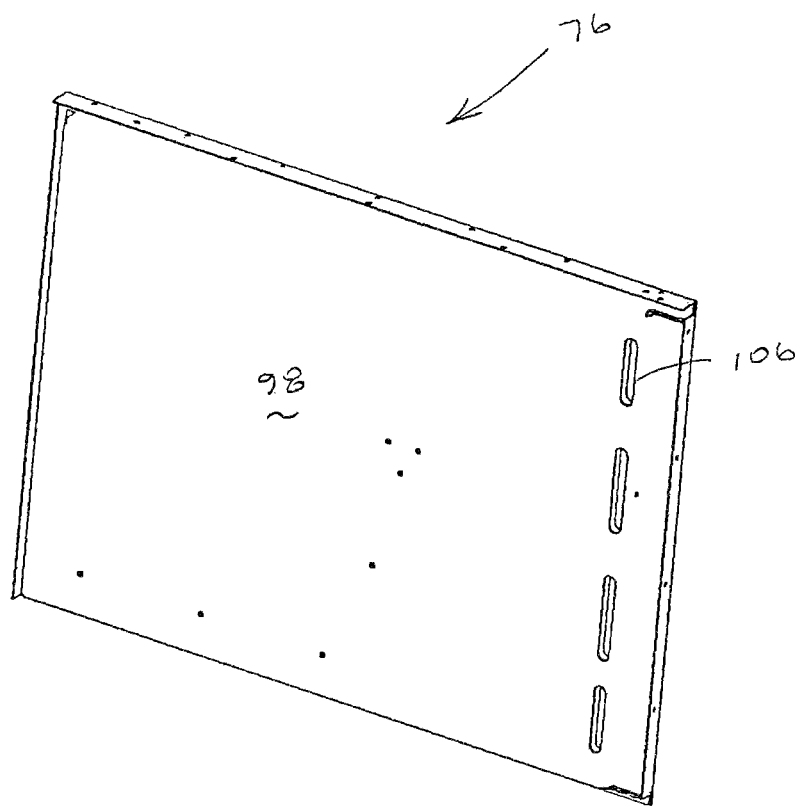
FIG. 22 is a perspective view of the inside face of the lock side wall panel.

In exemplary arrangements once the pocket 104 of the inner wall liner 58 has been filled with flowable cement material, the outer wall liner 122 shown in FIG. 21 may be attached thereto. The exemplary outer wall liner 122 includes an array of holes 150. The holes 150 are positioned to be aligned with the upper faces of the spacer brackets and spacer blocks which are in abutting relation with the planar portion 123 on the inside face of the outer wall panel 122. In exemplary embodiments the outer wall liner 122 is placed in attached engagement with the inner wall liner by plug welding in selected holes 150. Such plug welding is operative to engage the inside face of the planar portion 123 of the outer wall liner and the spacers in attached abutting engagement. Further in exemplary arrangements, some of the holes 148 in certain flange portions 146 may be utilized for purposes of engaging the inner wall liner and the outer wall liner through plug welding or other attaching methods. The attachment of the inner wall liner and the outer wall liner in fixed engagement surrounds the pocket 104 and the cement material therein In the exemplary embodiment the inner wall liner 98 and the outer wall liner 122 are engaged to form the panel 76 prior to the cement being cured. The panel 76 is then stored with the planar portion of the inner wall liner extending horizontally. In the exemplary arrangement, the assembled panels are stored in this manner and accumulated in inventory until they are needed to be utilized in assembly of secure chests. This enables the panels of exemplary arrangements to be assembled quickly in advance if needed to produce a chest. When the panels are needed, the cement will be further cured and hardened which will facilitate the strength and integrity of the panel, and provide attack resistance for the automated banking machine chest in which the panel is assembled.

FIGS. 23-28 represent the structure of the exemplary hinge side wall panel 78. The exemplary panel is formed using an inner wall liner 152. The inner wall liner is formed from a generally planar metal plate and includes a generally flat planar portion 154. The planar portion is bounded by a border wall 156. The border wall 156 includes a plurality of walls that extend transversely to the planar portion 154 and bound a pocket 158 therein.

The exemplary inner wall liner 152 of the hinge side wall 78 includes a plurality of elongated spacer brackets 124 in the pocket 158 thereof. Spacer brackets 124 are attached in fixed relation to the planar portion 154 in the pocket by plug welding in a manner previously described. The exemplary wall panel 78 also includes therein a plurality of spacer blocks 138 which may be similar to those previously discussed.

Figure 24:
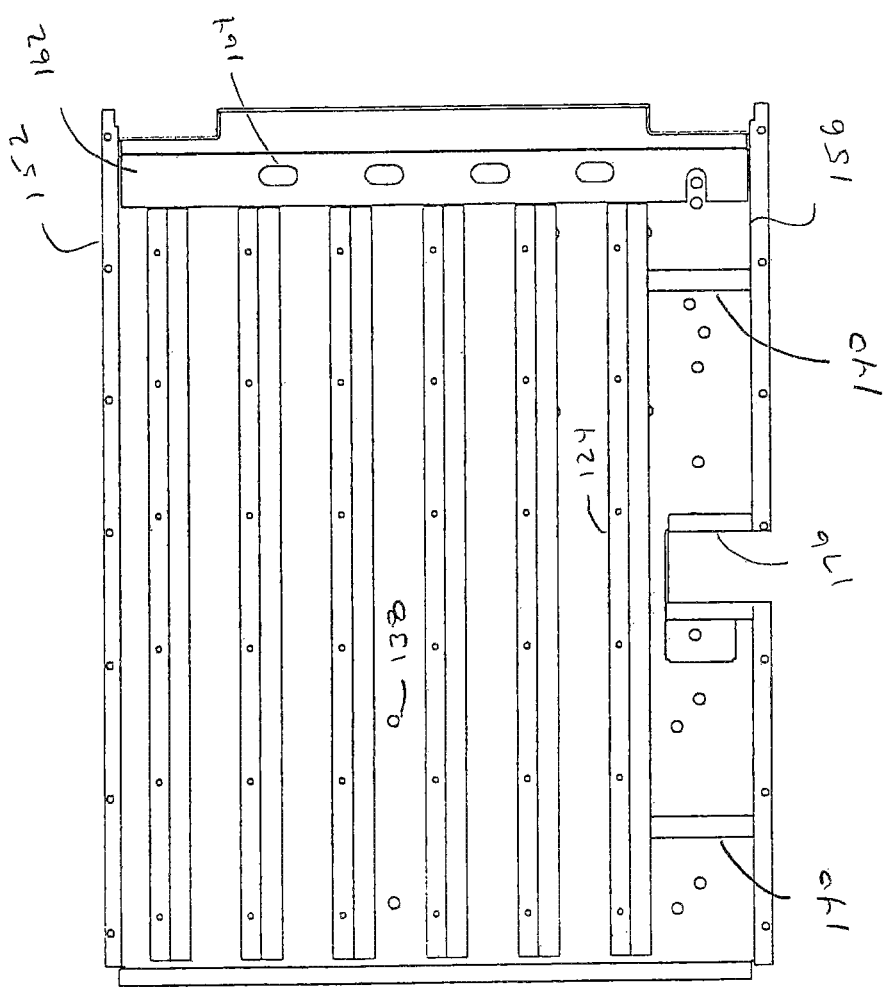
FIG. 24 is a top view of the inner wall liner of the hinge side wall panel with elongated bracket spacers, support leg accepting tubes and a reinforcing plate installed therein.

The exemplary hinge side inner wall liner includes a plurality of disposed liner apertures 160 therein. The liner apertures 160 correspond to the projections on the deadbolt 94 and are sized for accepting such projections therein when the chest door 68 is closed. Similar to the lock side wall, a reinforcing plate 162 shown in FIG. 26 includes apertures 164. Apertures 164 correspond to the liner apertures 160. The reinforcing plate 162 is attached to the inner wall liner 152. The liner apertures and the reinforcing plate apertures are secured in aligned relation as shown in FIG. 24.

Figure 25:
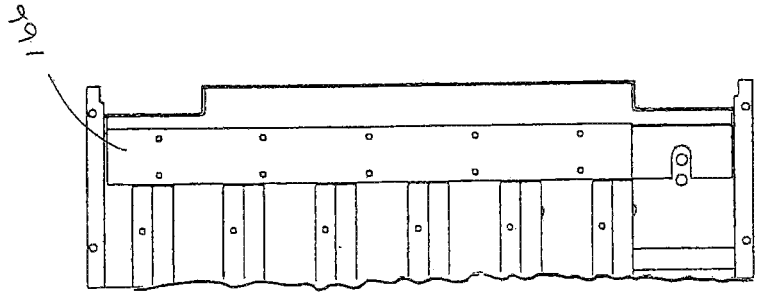
FIG. 25 is a partial view similar to FIG. 24 but with a metal security plate overlying the reinforcing plate.
Figure 27:
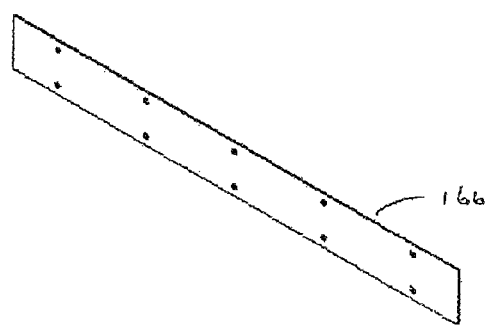
FIG. 27 is a perspective view of an exemplary overlying security plate.
Figure 26:
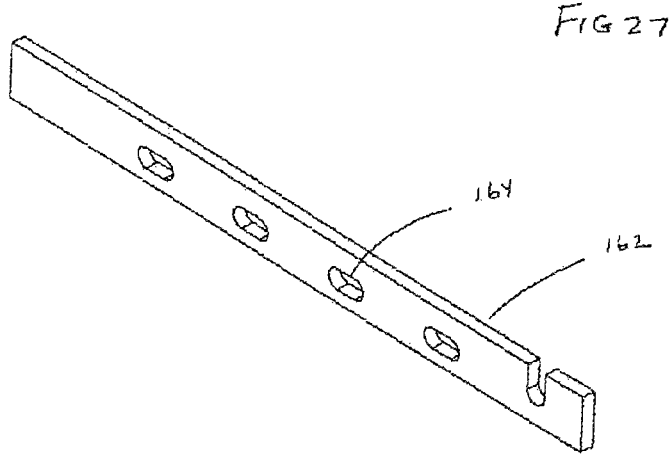
FIG. 26 is a perspective view of an exemplary reinforcing plate.
Figure 28:
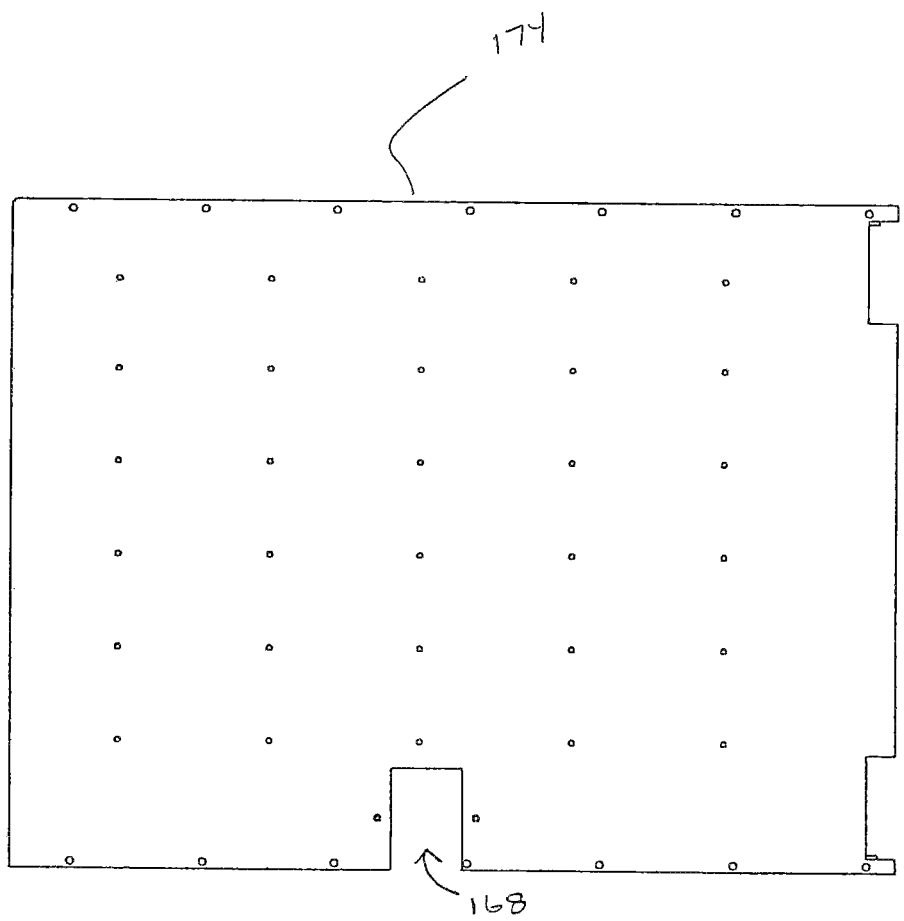
FIG. 28 is a plan view of the exemplary hinge side wall panel.
Figure 29:
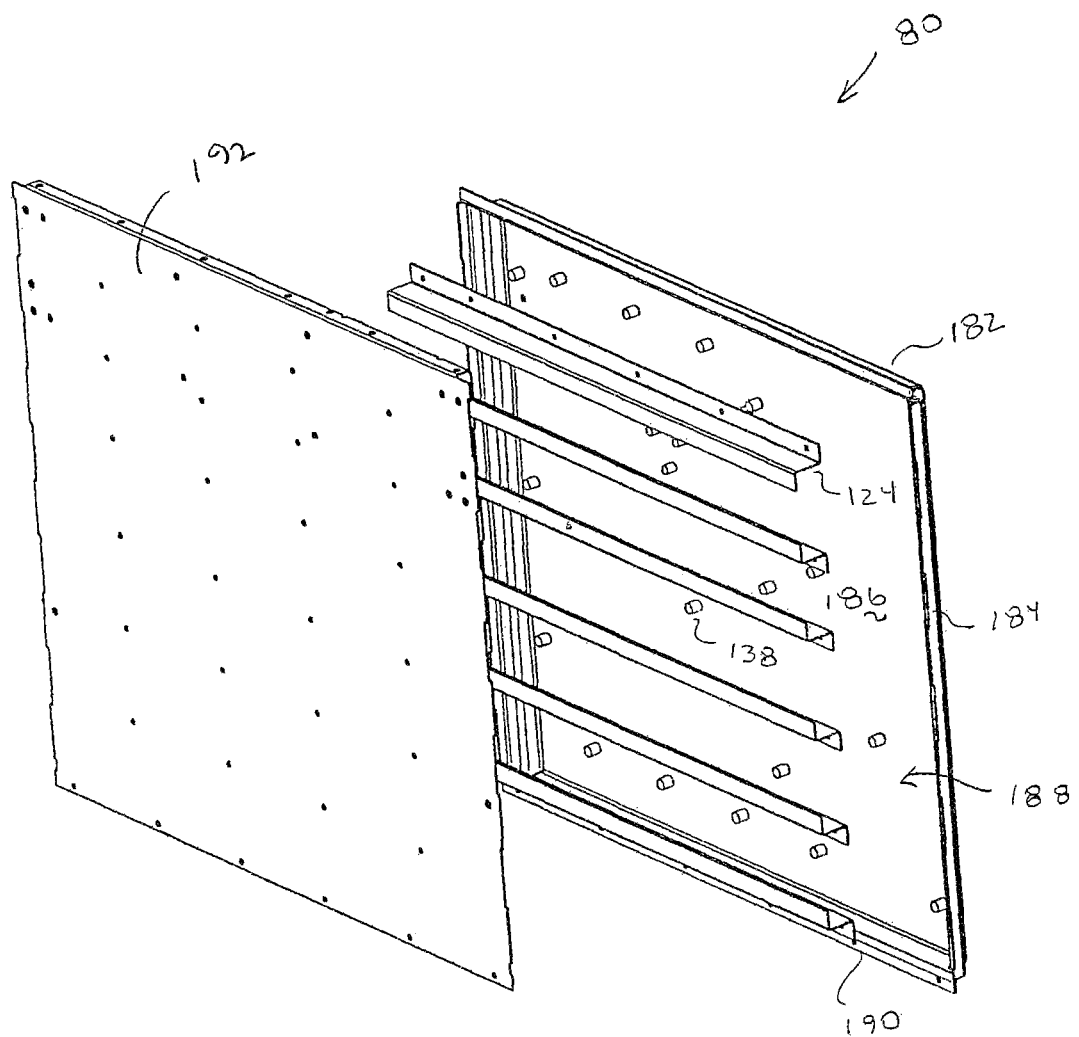
FIG. 29 is an exploded view of components included in an exemplary back wall panel.
Figure 30:
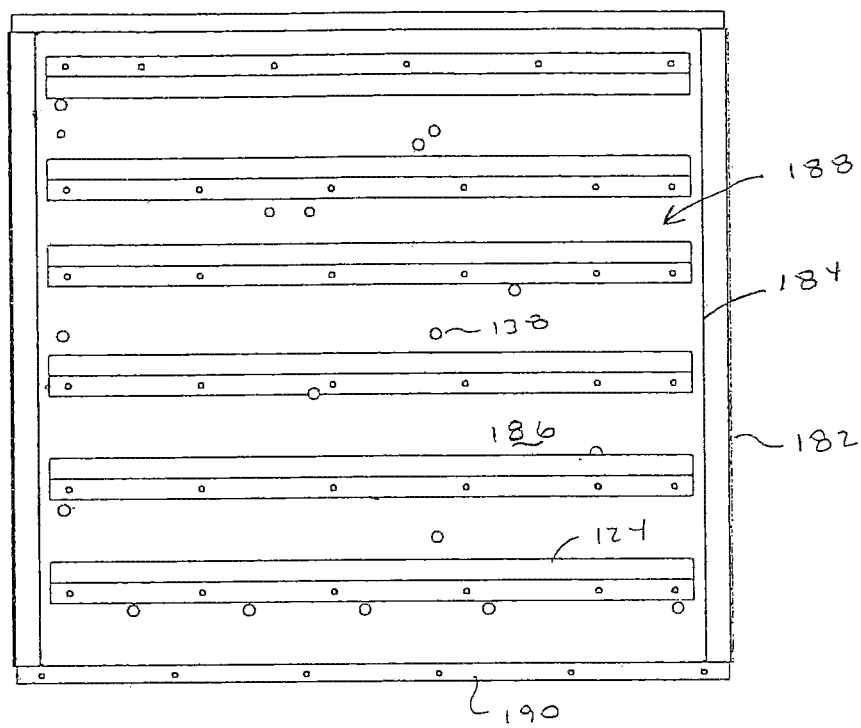
FIG. 30 is a top plan view of the inner wall liner of the back wall panel with elongated spacer brackets installed therein.
Figure 31:
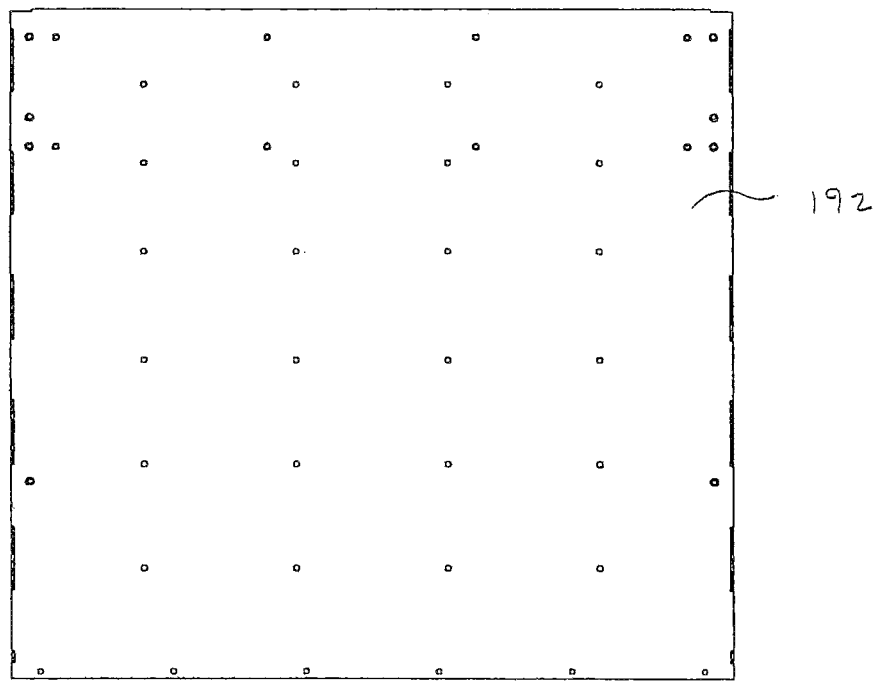
FIG. 31 is a top view of the outer wall liner of the back wall panel.

A metal security plate 166 shown in FIG. 27 is configured to overlie the apertures 164 in the reinforcing plate 162. The metal plate 166 is positioned in overlying relation of the reinforcing plate as shown in FIG. 25. The hardened metal plate is attached to the reinforcing plate by welding or other suitable fastening methods.

Similar to the lock side panel, the inner wall liner 152 of the hinge side panel has support leg accepting tubes 140 positioned therein. Each of the support leg accepting tubes 140 includes a leg accepting tube opening that is aligned with a border wall opening in the border wall 156.

The exemplary hinge side panel 78 includes therein a panel opening 168. The panel opening 168 is produced by having an opening 170 in the inner wall liner 152. A corresponding opening 172 extends in the outer wall liner 174. In order to prevent the flowable cement from passing out the opening 170 in the inner wall liner when the flowable cement is introduced to the pocket 158, barrier walls 176 are positioned in attached relation with the inner wall liner. The barrier walls 176 generally correspond to the outline of the openings 170, 172 so as to maintain the flowable cement material out of the panel opening.

The exemplary inner wall liner 152 also includes flange portions 178. The flange portions 178 include holes to facilitate plug welding therethrough. The exemplary inner wall liner further has hinge support brackets 180 welded in supported connection therewith. The hinge support brackets are configured for mounting hinges which operatively connect the hinge side wall panel 78 and the chest door 68 in movable supported connection.

In the exemplary arrangement for manufacture the inner wall liner 152 of the hinge side wall panel 78 is positioned with the planar portion 154 extending horizontally. The pocket 158 bounded by the upward extending border wall 156 is filled with the flowable cement. The flowable cement fills the pocket area between the spacers to the level of the upper faces of the spacers. The exemplary barrier walls 176 bounding the opening 170 in the inner wall liner prevents the flowable cement from passing out of the liner.

Once the pocket 158 is suitably filled with the flowable cement, the outer wall liner 174 is engaged with the inner wall liner and is fixed in attached relation thereto. In the exemplary embodiment, the inner wall liner and outer wall liner are attached in numerous disposed locations by plug welding through the holes in the outer wall liner 174 to the faces of the support brackets and also welding of the flange portions to the inner wall liner. Once the inner wall liner and the outer wall liner are engaged in attached relation, the hinge side wall panel 78 is stored with the planar portion extending horizontally until the wall panel is needed for assembly into a secure chest of an automated banking machine. During the storage time the cement continues to cure and hardens to facilitate attack resistance of the chest portion.

FIGS. 29-32 show the construction of the exemplary back side wall panel 80. The exemplary back side wall panel includes an inner wall liner 182 in the form of a metal plate formed in a manner like that previously discussed. The inner wall liner 182 includes a border wall 184 which extends transversely to a planar portion 186. The border wall 184 bounds a pocket 188.

The plurality of spacers are positioned in the pocket and attached to the planar portion 186. As with the other wall panels, the spacers include elongated spacer brackets 124 and spacer blocks 138. The spacers may be attached to the inner wall liner in a manner like that previously discussed. Of course it should be understood that these spacers are exemplary and in other arrangements, other types of spacers and spacer arrangements may be used. The exemplary inner wall liner further includes flange portions 190 like those previously discussed.

Similar to the method of making the other wall panels, the back panel is made by attaching the spacers to the inner wall liner 182, after the inner wall liner has been formed to include the border wall 184 and flange portions 190. Then with the planar portion 186 extending horizontally and the border wall extending upwardly from the planar portion, the pocket 188 is filled with the flowable cement. The flowable cement is filled to the level generally of the top faces of the spacers and leveled within the pocket.

Once the pocket 188 has been filled with the flowable cement, the outer wall liner 192 is positioned adjacent to and in aligned relation with the inner wall liner. The outer wall liner and the inner wall liner are then engaged in attached relation by welding, such as by plug welding, in the holes of the flange portion and plug welding in the holes of the outer wall liner to engage the top surfaces of the spacer.

Figure 32:
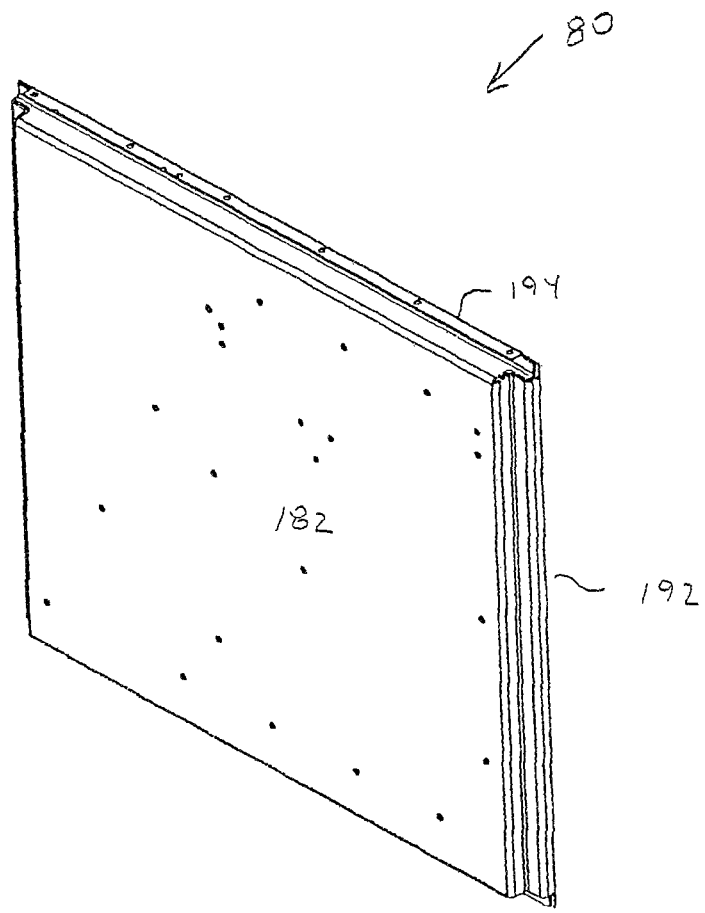
FIG. 32 is a perspective view of the assembled back wall panel.
Figure 33:
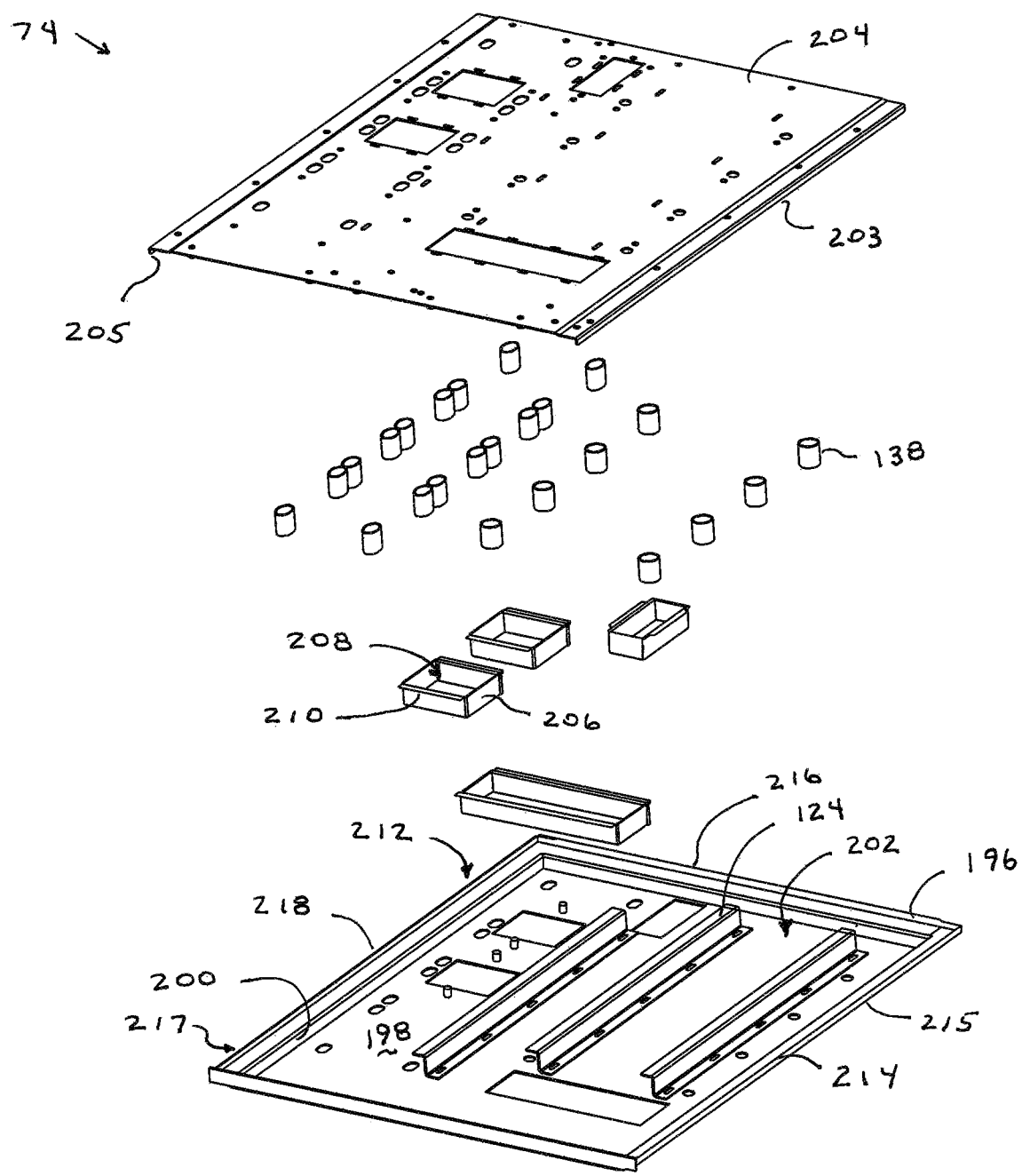
FIG. 33 is an exploded view of components included in an exemplary top wall panel.
Figure 34:
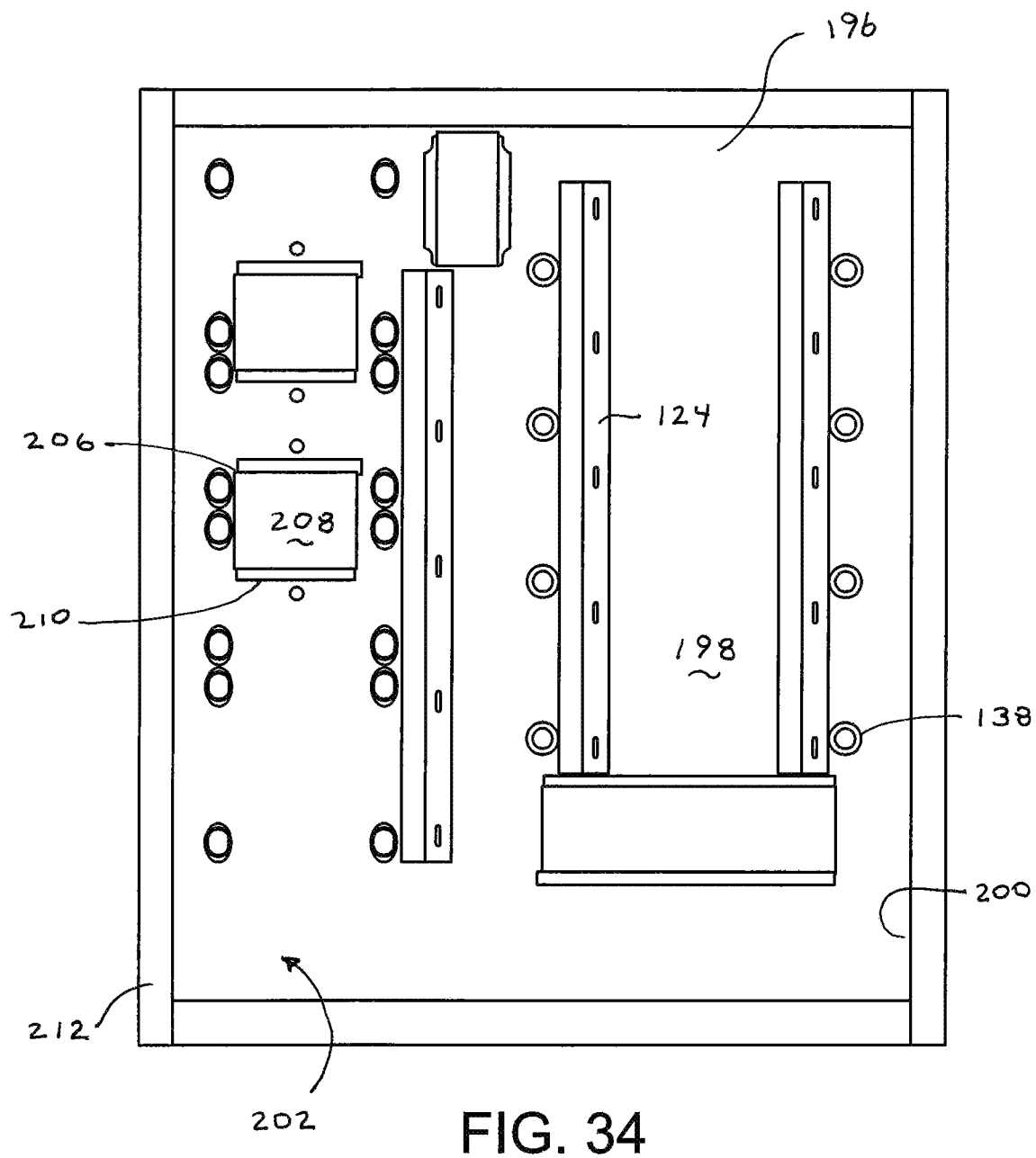
FIG. 34 is a top plan view of the inner wall liner of the top wall panel with spacers and barrier boxes installed therein.

It should be noted that the outer wall liners of each of the hinge side and lock side wall panels at the tops thereof as well as the outer wall liner of the back panel 80, each include peripheral tab portions. The peripheral tab portion is turned generally perpendicular to the planar portion of the outer wall liner. The peripheral tab portion 194 of the outer wall liner 192 of the back wall panel 80 is best shown in FIG. 32. As later explained, these peripheral tab portions extend outward beyond the flange portion at the top of the respective wall and serve to engage the top wall panel in the assembly of the safe as later shown. Of course it will be understood that this structure and method of assembly is exemplary and in other embodiments other approaches may be used.

The exemplary construction of top wall panel 74 is shown in FIGS. 33-37. As with the other panels, the top wall panel 74 includes an inner wall liner 196. The inner wall liner includes a planar portion 198. The planar portion 198 is bounded by a transversely extending border wall 200. The border wall 200 is comprised of four generally perpendicular wall portions that bound a pocket 202.

Within the exemplary top wall panel, a plurality of elongated spacer brackets 124 are positioned. The spacer brackets are attached to the inner wall liner in the planar portion in a manner like that previously discussed. The exemplary top wall panel 74 further includes a plurality of cylindrical spacer blocks 138.

The exemplary top wall panel includes a plurality of panel openings. As shown for each panel opening, there is a corresponding opening in the inner wall liner 196 and a corresponding opening in the outer wall liner 204. As in the previously described embodiment, barrier walls are provided to bound the openings in the inner wall liner and prevent the flowable cement from passing therefrom. In this exemplary arrangement, the barrier walls are formed as a box, for example box 206. Box 206 is sized to conform with the size of the panel openings. Box 206 includes an open end 208 at each side which is open to the respective openings in the inner wall liner and the outer wall liner.

In exemplary arrangements, the box 206 includes box flanges 210 that extend outward and generally flush with each open end. In the exemplary arrangement, box flanges are configured so as to be attachable via welding to an adjacent liner. In some exemplary arrangements, the boxes may include box flanges adjacent each open end to facilitate attachment of the box to both the inner wall liner and the outer wall liner. In other exemplary arrangements the box flanges may extend at only one end. This may be, for example, to attach to the outer wall liner via plug welding while the barrier wall bounding the box at the other end may be tack welded to the planar portion prior to the introduction of the flowable cement into the pocket. Of course in various embodiments, different approaches may be taken to providing barrier walls adjacent to panel openings.

In the exemplary top wall panel, flange portions 212 similar to those previously discussed may be provided. The flange portions extend outwardly from the border wall.

In the exemplary top wall panel, strip portions 214, 216 and 218 extend from the flange portion. The strip portions extend from the flange portions at each of the hinge side, the lock side and the back side of the top wall panel. Each of the strip portions provides for engagement with the peripheral tab portions for purposes of facilitating assembly as later discussed. The exemplary strip portions are integrally formed with the flange portions of the inner wall liner. Exemplary strip portions 214 and 218 include lip portions 215, 217 respectively that extend parallel to the order wall 200. The top panel 204 includes turned edge portions 203, 205 that are configured to overlie lip portions 215, 217 respectively when the top panel is assembled. Of course this construction is exemplary and in other embodiments other constructions may be used.

As with the other wall panels, the exemplary top wall panel is produced by forming the inner wall liner 196 from a sheet of suitable metal material. The border wall 200 and flange portion 212 are formed so as to bound the pocket 202. The elongated spacer brackets and spacer blocks 128 are attached to the inner wall liner as are the boxes 206 that provide the barrier walls around the openings. Thereafter, the pocket 202 is filled with the flowable cement to the level of the top faces of the spacer brackets and spacer blocks. In the exemplary arrangement, flowable cement is also generally at the level of the box flanges 210.

Once the pocket 202 has been filled with flowable cement, the outer wall liner 204 is engaged in attached relation with the inner wall liner. The outer wall liner is also engaged with the upper faces of the spacers and the box flanges through plug welding through the holes in the outer wall liner 204.

Figure 35:
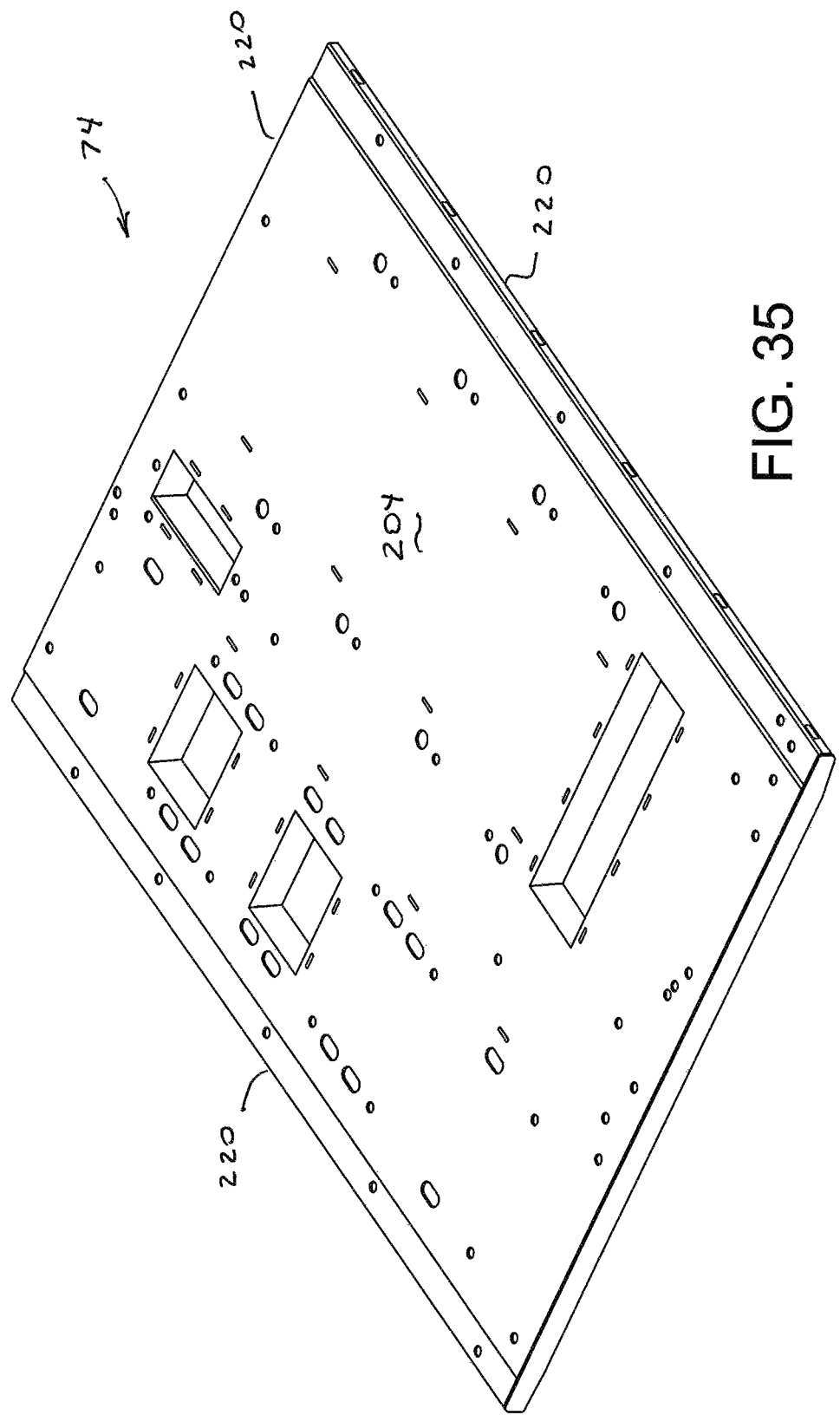
FIG. 35 is a top view of the top wall panel.
Figure 36:
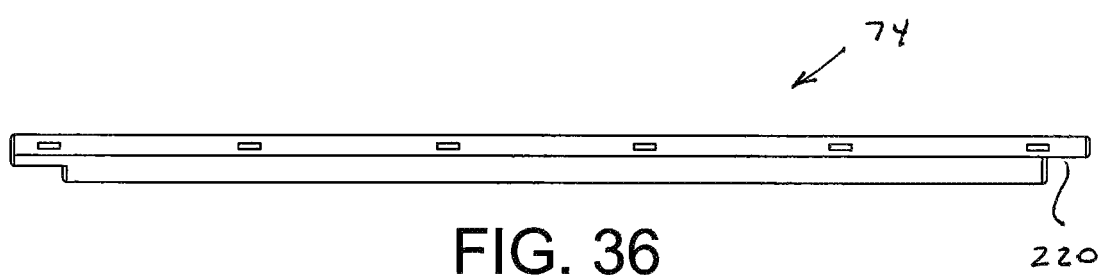
FIG. 36 is a right hand view of the top wall panel as shown in FIG. 35.
Figure 37:
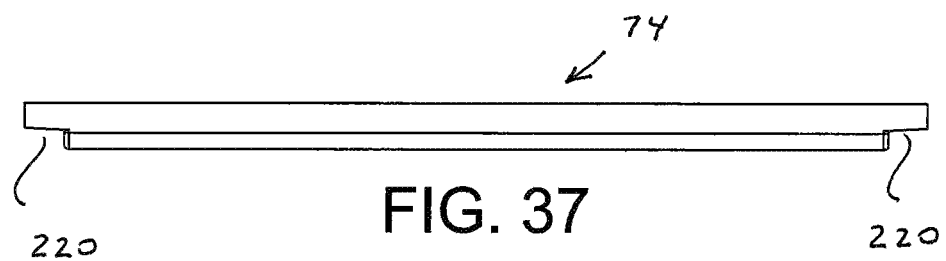
FIG. 37 is a back side view of the top wall panel as shown in FIG. 35.

As can be seen in FIGS. 35-37, the exemplary arrangement of the top wall panel includes outward extending projections 220 about the periphery thereof. Projections 220 are used to facilitate assembly in the manner that is later discussed.

After the inner wall liner and the outer wall liner of the top wall panel are engaged so as to surround the pocket 202 therein, the top wall panel 74 is stored with the planar portion 198 thereof in a horizontal orientation. During storage, the concrete material cures and hardens while the panel is waiting to be used in the assembly of a secure chest portion of an automated banking machine.

Bottom side wall panel 82 of the exemplary chest is formed in a manner generally similar to the side wall panels, top wall panel and back wall panel previously discussed. A suitable inner wall liner and outer wall liner are formed to meet the dimensional requirements of the bottom wall panel. Suitable spacers are provided therein as are the desired panel openings. A pocket formed and bounded by a border wall and planar portion of the inner wall liner is filled with flowable cement, and the outer wall liner is attached to the inner wall liner to surround the pocket and form the panel. The complete method of making the exemplary bottom panel will not be discussed herein for purposes of brevity and the foregoing descriptions provide the information necessary to produce such a panel.

Although in the exemplary embodiment the cement is poured into a pocket within the interior side wall liner, in other arrangements the arrangement may be reversed. For example, the flowable cement may be introduced into the outside wall liner. Also, in some arrangements cement may be introduced into pockets in both inside wall liners and outside wall liners.

A useful aspect of the exemplary embodiments is that the wall panels of the chest may be made in advance of the need to make a secure chest for an automated banking machine. The panels of various sizes and suitable configurations may be stored in inventory until they are needed. Further as can be appreciated, different configurations of automated banking machines that include different devices may require some panels that are identical to those used with other types of automated banking machines, while some panels may be specific to the particular model. For example, in some arrangements, the bottom, side and back panels for several different models may be the same, while the top wall panel may be different to provide different openings or configurations for the different devices. Similarly in other arrangements, the bottom and top panels may be the same for several models while the side wall panels and back panels may be different by being longer to produce a higher secure chest. Having the various panels available in inventory to produce chests of different configurations facilitates the ability to produce different models of automated banking machines more rapidly and conveniently. Of course it should be understood that this approach is exemplary and in alternative arrangements other approaches may be taken.

FIGS. 38-41 represent the steps in construction of an exemplary secure chest such as chest 66 of an automated banking machine. In the exemplary assembly, the bottom side wall panel 82 is positioned on the assembly support surface. It should be noted that the exemplary bottom side wall panel 82 includes openings therein for anchors and other supports. The exemplary bottom side wall panel further includes openings in the flange portions thereof which are suitable for receiving the stems of support legs which can be extended into the support leg accepting tubes in the exemplary side wall panels.

Figure 39:
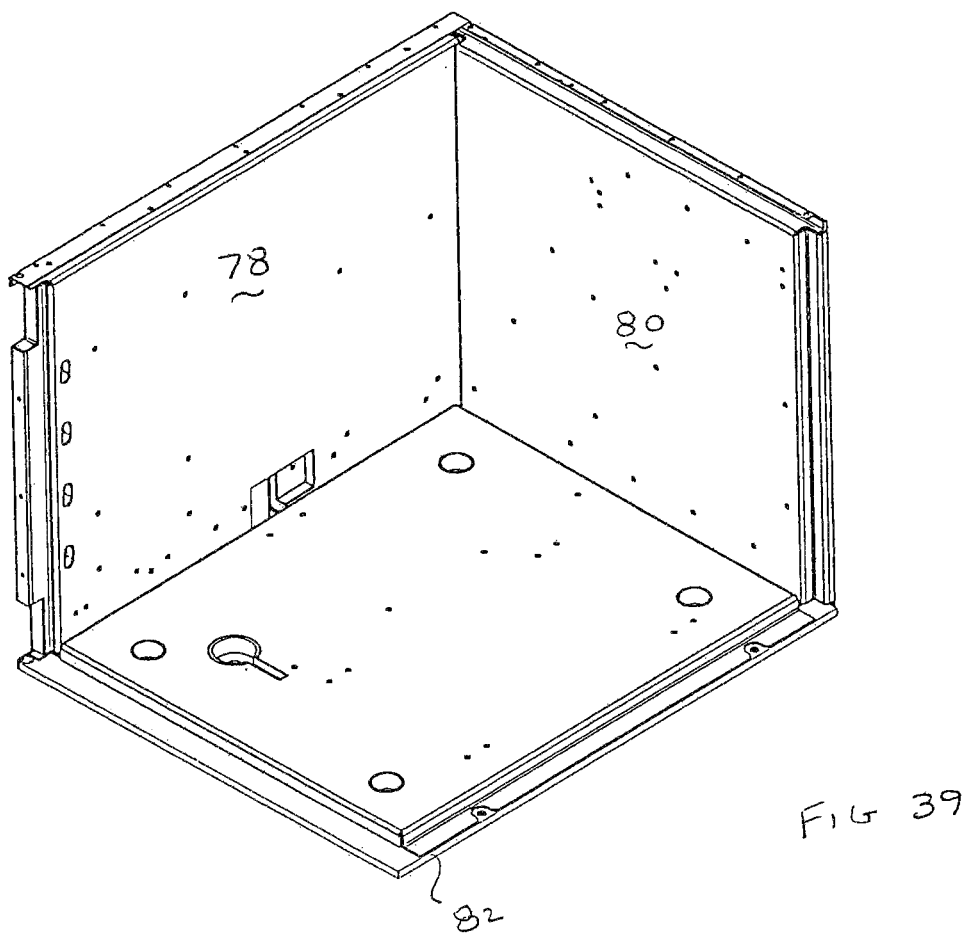
FIG. 39 is a top right perspective view showing the exemplary hinge side wall panel and back wall panel in attached engagement with the bottom wall panel.
Figure 38:
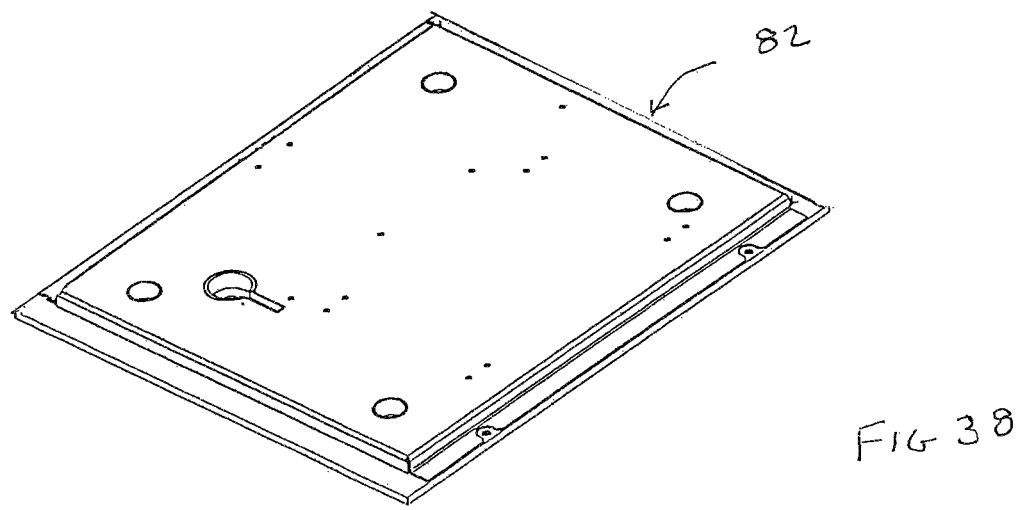
FIG. 38 is a top perspective view of an exemplary bottom wall panel of the secure chest.

In the exemplary arrangement the hinge side wall panel 78 and the back side wall panel 80 are positioned in engagement with the bottom side wall panel 82 as shown in FIG. 39. The bottom hinge and back side wall panels are attached in fixed engagement by welding the interior wall liners thereof in engaged relation in the area that will become the interior area of the chest. In exemplary arrangements, suitable fixtures may be utilized for purposes of holding the panels in a secure and square engagement during welding.

Figure 40:
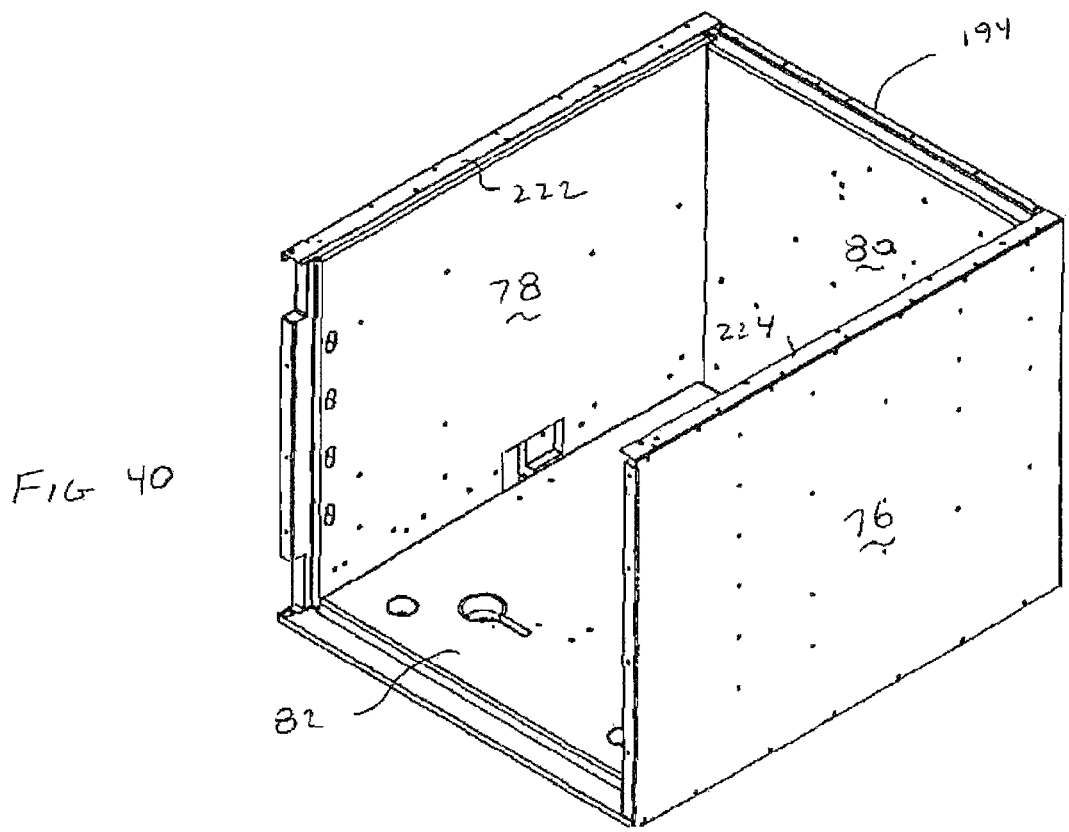
FIG. 40 is a view similar to FIG. 39 but with the lock side wall panel in attached relation with the bottom wall panel and the back wall panel.

As shown in FIG. 40, the lock side of wall panel 76 is next engaged with the bottom side wall panel 82 and back side wall panel 80. The lock side wall panel 76 is also fastened in fixed engagement with the other wall panels by welding in the interior area and in the extending flange portions.

As shown in FIG. 40, the peripheral tab portion 194 of the back wall panel 80 is positioned in aligned relation with the inward extending peripheral tab portions 222 and 224 on the inside wall panel 78 and lock side wall panel 76 respectively.

Figure 41:
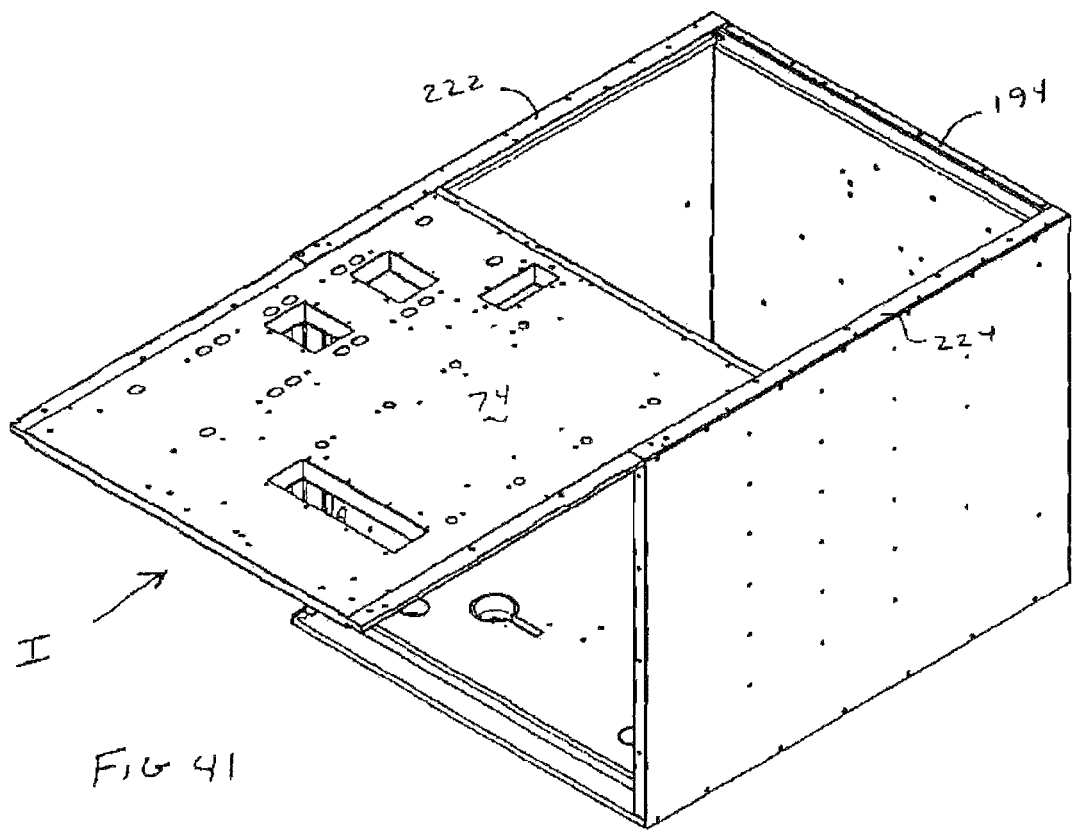
FIG. 41 is a view similar to FIG. 40 but with the top wall panel shown being moved into position in engagement with the hinge side wall panel, the lock side wall panel and the back wall panel.

As represented in FIG. 41, the top side wall panel 74 is then engaged with the lock and hinge side wall panels and the back side wall panel by sliding the top wall panel 74 in the direction of Arrow I. As can be appreciated, the projections 220 of the top side wall panel are engaged in the slots formed by the peripheral tab portions 222, 224 and 194. Once the top wall panel 74 is moved fully inward so as to engage each of the peripheral tab portions, the top side wall panel is attached in engagement with the slot and hinge side wall panels and the back wall panel. This is accomplished by plug welding in the holes that extend through the peripheral tab portions as well as the holes that extend through the areas adjacent to the peripheral tab portions in the outer wall liners. This enables securing the top side wall panel without the need for welding of the top side wall panel within the interior area of the chest. Further in exemplary arrangements, holes that extend in the peripheral flange portions of the other wall panels may be utilized for purposes of plug welding or otherwise fastening adjacent wall panels together about the periphery thereof. Of course it should be understood that these approaches are exemplary and in other embodiments, other approaches may be used.

Figure 42:
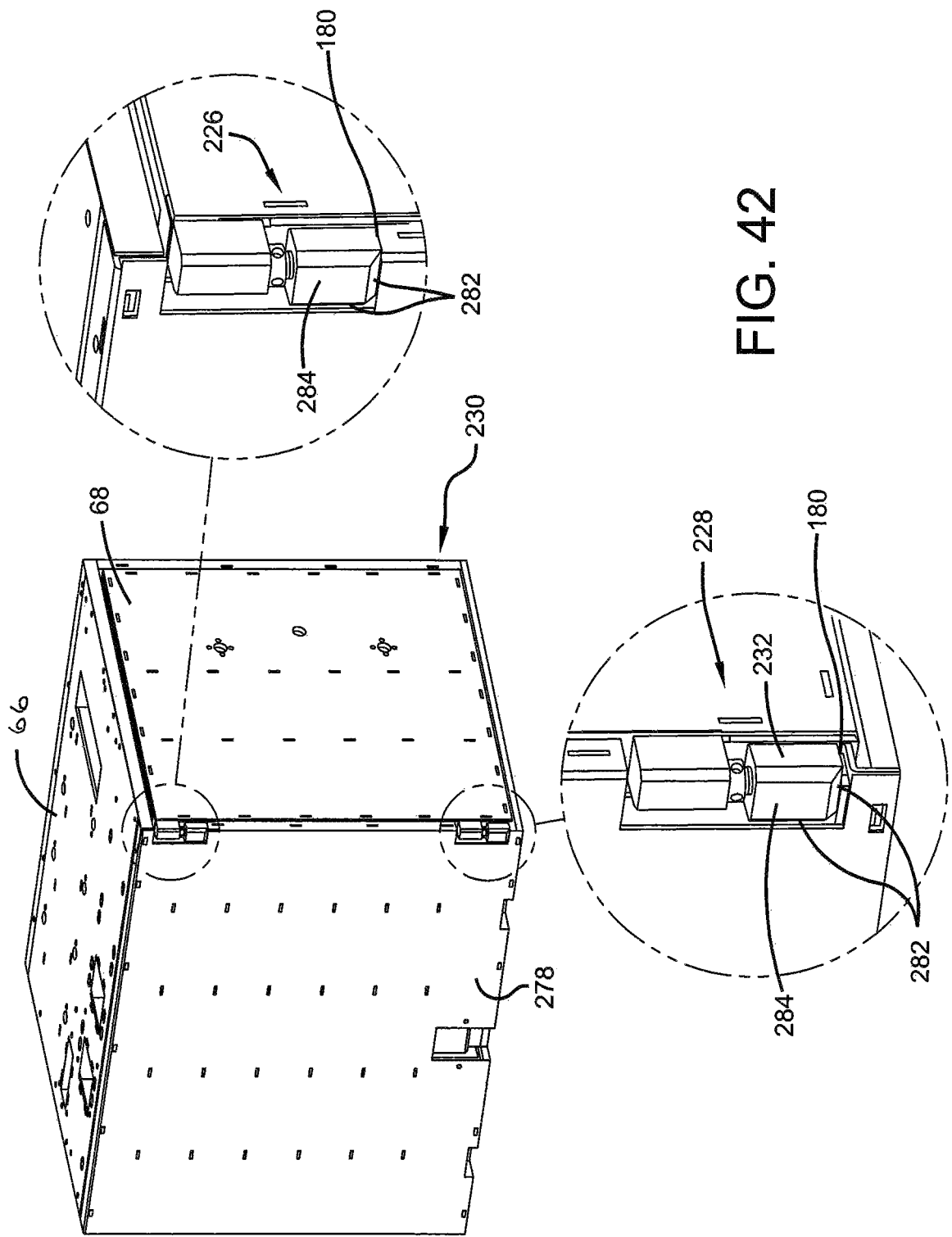
FIG. 42 is a perspective view of an exemplary chest including the hinges that connect the chest door to the hinge side wall panel.

FIG. 42 shows the exemplary chest 66 including the hinges 226, 228 that movably connect the chest 62 and the chest door 68. Hinge 226 is an upper hinge that is disposed adjacent to the top of the chest door 68. Hinge 228 is a lower hinge that is disposed near the bottom of the chest door. In the exemplary arrangement hinges 226 and 228 are identical and axially aligned about an axis or rotation of the chest door. However in other arrangements the hinges may be different.

The hinges of the exemplary arrangement enable the relative adjustment of the chest door 68 to the opening 230 created at the front side of the top, bottom, back and side wall panels which form the chest. In an exemplary arrangement the hinges 226, 228 enable vertical and horizontal pitch adjustment of the chest door 68 so as to enable the chest door to close the opening 230 when the door is in the closed position, and to rotate smoothly in supported connection with the hinges to an open position of the chest door in which the door is disposed away from the opening.

Figure 43:
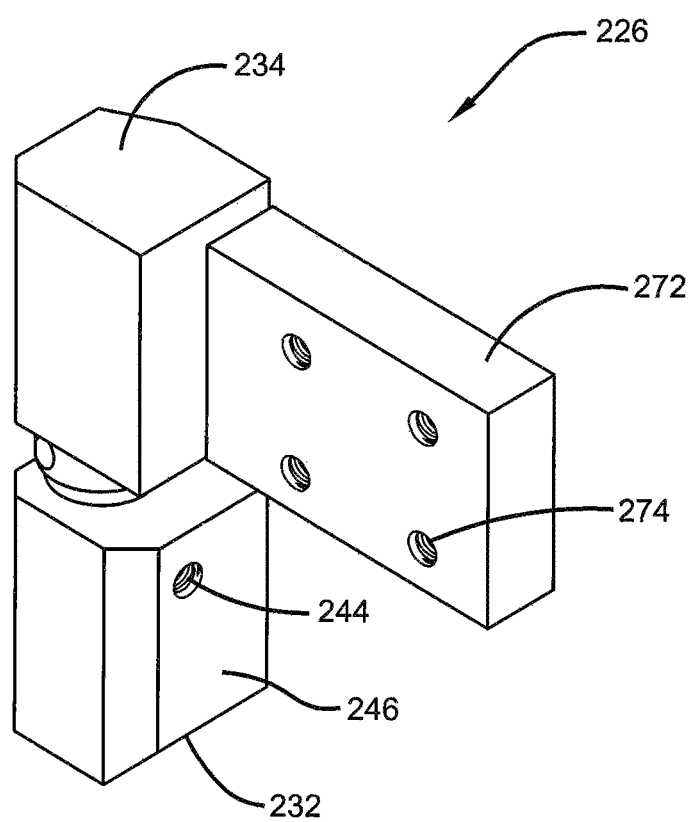
FIG. 43 is a perspective view of an exemplary hinge.

FIGS. 43 through 45 show the detailed construction of the hinges. Because in the exemplary embodiment the hinges are identical, only hinge 226 will be described. The hinge includes a lower hinge piece to 232 and upper hinge piece 234. Lower hinge piece 232 includes a threaded bore 236 therein. Threaded bore 236 extends along an axis 237. In the exemplary arrangement the threaded bore comprises a blind bore that terminates in a closed area within the lower hinge piece. Lower hinge piece 232 further includes a threaded hole 238. As shown in FIG. 45 threaded hole 238 extends transversely to the threaded bore 236. In the exemplary arrangement a threaded screw 240 extends in the threaded hole. In the exemplary arrangement the threaded screw comprises a set screw which includes a hexagonal recess or other suitable tool engaging portion 242. The threaded hole 238 extends outwardly to an opening 244 in a door side 246 of the lower hinge piece 232. The door side 246 of the lower hinge piece is in close adjacent relation with the side of the chest door 68 when the door is in the closed position.

Upper hinge piece 234 includes an unthreaded bore 248. The unthreaded bore 248 is coaxially aligned with the threaded bore 238 along the axis 237. The unthreaded bore 248 terminates radially upward in a closed end 250. While in the exemplary arrangement the closed end comprises a frustoconical recess, in other exemplary arrangements the closed end may include another form of radially inward extending surface.

Figure 47:
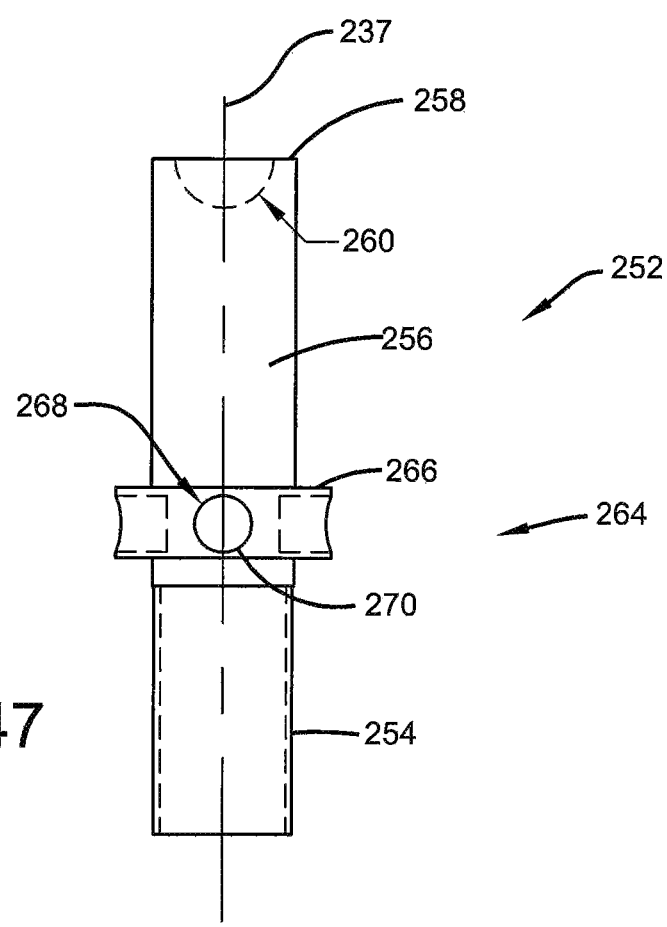
FIG. 47 is a side view of an exemplary hinge pin.

In an exemplary arrangement a hinge pin 252 extends along axis 247 between the upper hinge piece and the lower hinge piece. Hinge pin 252 which is shown in greater detail in FIG. 47, includes a threaded end 254. Threaded end 254 is engaged in threaded bore 236. Hinge pin 252 further includes an unthreaded end 256. Unthreaded end 256 extends in the unthreaded bore 248. Exemplary hinge pin 252 terminates upwardly at a top portion 258. Top portion 258 includes a hemispherical recess 260. In the exemplary arrangement a ball 262 extends in nested relation in the hemispherical recess 260. The ball 262 is positioned in engaged relation with the radially inward extending surface of the closed end 250. In the exemplary arrangement the upper hinge piece 234 is rotatable relative to the hinge pin 252 in supported connection with the ball 262.

Hinge pin 252 further includes a central portion 264. Central portion 264 is externally accessible in an area between the upper hinge piece 234 and the lower hinge piece 232. In the exemplary arrangement the central portion includes a flange 266. The exemplary flange is radially enlarged relative to the threaded end and the unthreaded end of the hinge pin. The exemplary central portion 264 includes at least one tool engaging surface to facilitate rotation of the hinge pin relative to the upper hinge piece and the lower hinge piece. In the exemplary arrangement including the flange 266, an outer surface includes a plurality of angularly spaced inward extending apertures 268. In the exemplary embodiment apertures 268 are bounded by a circular annular tool engaging surface 270. The exemplary apertures are sized to accept therein a tool such as a circular rod or other generally circular piece that enables rotation of the hinge pin by engagement of the tool therein. Of course it should be understood that this form of tool engaging surface is exemplary in other embodiments other types of tool engaging services which enable the rotation of the hinge pin relative to the upper and lower hinge pieces may be utilized.

In the exemplary embodiment the upper hinge pin 234 further includes a plate portion 272. Plate portion 272 extends from the upper hinge piece generally transversely of the axis 237. The exemplary plate portion 272 includes a plurality of threaded fastener accepting openings 274. In the exemplary embodiment, openings 274 comprise threaded openings that are configured to accept threaded fasteners therein. As later discussed, plate portion 272 is utilized in the exemplary embodiment to provide horizontal pitch adjustment of the chest door 68 relative to the chest 66 and the chest opening 230.

In the exemplary embodiment the lower hinge piece 232 does not include a plate portion like that of the upper hinge piece. However in alternative arrangements the lower hinge piece may include such a plate portion having a similar structure to the plate portion of the upper hinge piece. In such arrangements a plate portion of lower hinge piece may extend perpendicular to the plate portion of the upper hinge piece when the chest door 68 is in a closed position. A plate portion extending from the lower hinge piece may include openings which enable the lower hinge piece to be attached in adjustable fixed connection with the hinge side wall panel of the chest. Such a lower hinge piece plate portion may enable horizontal movement of the lower hinge piece relative to the chest to enable vertical pitch adjustment of the chest door relative to the chest.

Figure 46:
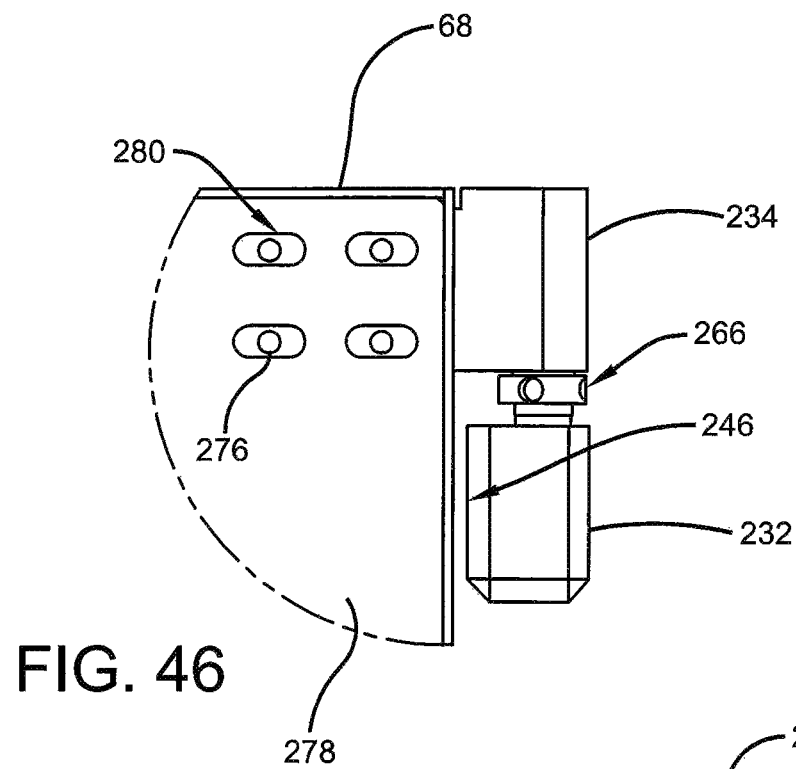
FIG. 46 is a back view of the exemplary hinge in connection with an exemplary chest door.

As shown in FIG. 46 in an exemplary embodiment chest door 68 includes a door inside wall surface 278. The door inside wall surface includes an arrangement of four elongated door horizontal pitch adjustment slots 280 adjacent to each hinge. In the exemplary arrangement the plate portion 272 of the hinge extends in the door 68 forward of the door inside wall surface 278. Releasable door fasteners 276 extend through each of the horizontal pitch adjustment slots 280. The releasable door fasteners of the exemplary arrangement are each engaged in openings 274 in threaded engagement. Each of the door fasteners are changeable between tightened and loosened conditions. In the tightened condition, the door fasteners are operative to hold the door and upper hinge piece in fixed relative position. In a loosened condition of the fasteners, the horizontal pitch adjustment slots 280 enable relative horizontal movement of the door 68 relative to each upper hinge piece 234. This enables the horizontal pitch of the door to be adjusted relative to the chest 66. This enables the horizontal pitch of the door to be adjusted.

In some exemplary embodiments the releasable door fasteners may comprise threaded bolts which can be selectively changed between tightened and loosened conditions so as to enable making horizontal pitch adjustments. Such horizontal pitch adjustments enable positioning of the chest door so that it will extend in the chest opening 230 in the closed position with a close uniform gap on all four sides. As the releasable door fasteners are only accessible on the inside wall surface 278 of the chest door, the fasteners are not accessible externally when the chest door is closed. In some exemplary arrangements, the releasable door fasteners 276 may also be utilized to hold other structures in fixed relation with the door. Such structures may include, for example, the deadbolt 94 on the hinge side of the door shown in FIG. 6. Of course these approaches are exemplary and in other embodiments other approaches may be used.

Although not utilized in the exemplary embodiment, similar arrangements can be associated with lower hinge plate portions in other embodiments to provide horizontal movement of the lower hinge portion relative to the hinge side wall panel. Such arrangements may be utilized when it is desirable to provide for the selective adjustment of the vertical pitch of the chest door relative to the chest. Further in other alternative arrangements the hinge configuration may enable both horizontal pitch adjustment and vertical pitch adjustment of the door so as to provide the precise desired positioning thereof. Of course it should be understood that the structures and arrangements described for achieving pitch adjustment of the chest door are exemplary, and in other embodiments other arrangements may be used.

In an exemplary embodiment the lower hinge piece 232 is attached in fixed relation with the hinge side wall panel 278 of the chest. In the exemplary arrangement at least one lower hinge piece outer portion 282 is attached in fixed connection with the wall panel by welding or similar fastening methods. In the exemplary arrangement the hinge piece outer portions are connected in welded engagement with the hinge support bracket 180 adjacent to the lower hinge piece. In an exemplary arrangement the welded connection is made along both a rear and lower edge of outer hinge side 284. In the exemplary arrangement the outer hinge side 284 is opposite the door side 246 of the lower hinge piece. Of course this method for joining the lower hinge piece and the hinge side wall panel in fixed connection is exemplary, and in other embodiments other approaches may be used The exemplary hinges 226, 228 each enable the vertical adjustment of the chest door 68 relative to the chest 66. Vertical adjustment of the chest door is achieved by first positioning the screws 240 so that they do not engage with the threaded end 254 of the hinge pin 252. This is achieved in the exemplary arrangement by extending an Allen wrench or other suitable tool through the opening 244 and rotating the screw so that the inward end thereof is disposed away from the threaded bore 236. As can be appreciated, access to the threaded screw 240 is only possible when the chest door is in the open position.

With the threaded screws 240 retracted from the threaded bores, the central portion 264 of the hinge pins may be rotated relative to the lower hinge pieces 232. The threaded engagement of the threaded end 254 of each hinge pin 252 in each threaded bore 236 causes vertical movement of the top portion 258 of the respective hinge pin in the unthreaded bore 248 of the respective upper hinge piece. In the exemplary arrangement, movement of the top portion of the hinge pin is operative to selectively raise or lower ball 262 upon which the upper hinge piece 234 is supported. Such selective raising and lowering of the ball 262 as a result of rotation of the central portion of the hinge pin enables the selective vertical positioning of the door relative to each of the lower hinge pieces and the chest.

In the exemplary arrangement the hinge pin 252 is enabled to be readily rotated relative to each of the upper hinge piece and the lower hinge piece by engagement of a rod or other suitable tool in one of the radially extending apertures 268 that extend in the flange 266. Each of the hinge pins 252 may be suitably adjusted so that the weight of the chest door 68 is borne equally by each of the upper and lower hinges 226, 228. Once the hinge pins 252 of each hinge have been suitably vertically positioned, the set screws 240 in each of the lower hinge pieces may be tightened. Tightening each of the set screws causes the set screws to engage the respective threaded ends 254 of the hinge pins. Such engagement generally prevents the hinge pins from rotating relative to the lower hinge pieces as the chest door is opened and closed. Thus, the vertical positioning of the chest door does not change with the repeated opening and closing of the door.

As can be appreciated, once the screws 240 are engaged with the threaded ends of the hinge pins the chest door can be moved toward the closed position. If there is a need to adjust the horizontal pitch of the chest door, the releasable door fasteners 276 may be changed to the loosened condition so that the horizontal pitch of the door may be changed so as to align the chest door with the chest opening. The releasable door fasteners may then be changed to the tightened condition once the chest door has been suitably positioned. The chest door can then be moved to a closed position in which the edge of the chest door adjacent to the hinges moves into close proximity with the openings 244 of each of the hinges. This close proximity of the chest door is effective to block access to the openings 244 with the chest door in the closed position. This configuration prevents a criminal from turning the hinge pins to try to change the position of the chest door in the chest opening for criminal purposes such as to try to produce a gap for the insertion of burglary tools or the like. Of course this approach is exemplary and other embodiments other approaches may be used.

Thus the exemplary hinges used in connection with the chest and door structures provide a secure movable connection between the chest door in the chest. The ready capabilities for vertical and pitch adjustments of the chest door relative to the chest are also provided by the exemplary embodiments. The exemplary hinges further provide a chest door that is readily movable between the closed position and the open position when the chest door is in the unlocked condition.

Thus as can be appreciated, the exemplary embodiments provide secure chest portions of automated banking machines that can be more readily produced and assembled. The exemplary arrangements also provide a secure cement filled panel structures that are highly resistant to various types of attacks. The exemplary embodiments may also be readily tailored to address different configurations of automated banking machines and to facilitate the construction thereof.

Of course it should be appreciated that the different devices, methods and configurations shown herein are exemplary. Exemplary configurations used in connection with one embodiment may be utilized in connection with different embodiments in producing different machines and in implementing methods to provide beneficial results.

Although certain exemplary arrangements and processes have been described herein, a wide array of modifications, variations and alternatives are also within the spirit and scope of the principles described herein. Particular components, features, properties, attributes, relationships and methods may be combined with other components, features, properties, attributes, relationships and/or methods to achieve the beneficial capabilities and functionalities.

It will also be readily understood that the features and approaches of exemplary embodiments as described and illustrated herein can be arranged and designed in a wide array of different configurations. That is features, structures and/or characteristics of embodiments described herein may be combined in any suitable manner in one or other embodiments or arrangements. Thus the detailed description of the exemplary embodiments of the apparatus, methods and articles are not intended to limit the scope of the embodiments as claimed but are merely representative of selected exemplary embodiments that implement the principles described herein.

In the foregoing description, certain terms have been used to describe example arrangements for purposes of brevity, clarity and understanding. However, for example, certain terms such as "upward," "downward," "higher," "lower," "left," "right," "outer," "inner," "front," "rear," "top," and "bottom" may have been used. However, no unnecessary limitations are to be implied therefrom because such terms have been used for descriptive purposes and are intended to be broadly construed. Such terms shall not be construed as limitations on the scope of the claims hereof. Moreover, the descriptions and illustrations herein are by way of examples and the inventive teachings are not limited to the specific details that have been shown and described.

The exemplary structures and arrangements along with the methods of producing and using such structures and arrangements achieve at least some desirable objectives, eliminate difficulties encountered in the use of prior devices and systems, solve problems and attain the desirable results described herein.

In the following claims any feature described as a means for performing a function shall be construed as encompassing any means known to those skilled in the art to be capable of performing the recited function and shall not be deemed to be limited to the particular means used for performing the function in the foregoing description or mere equivalents thereof.

Having described the features, discoveries and principles of the exemplary embodiments, the manner in which they are constructed and operated, and the advantages and useful results obtained, the new and useful structures, devices, elements, arrangements, parts, combinations, systems, equipment, operations, methods, processes and relationships are set forth in the appended claims.

We claim:
1. A method comprising:
producing a secure chest adapted to hold cash dispensable from an automated banking machine including:
a) producing a wall panel, including
  i) providing a first wall liner, wherein the first wall liner includes a first planar portion,
    at least one first border wall, wherein the at least one first border wall extends transverse to the first planar portion,
    wherein the first planar portion and the at least one border wall bound a pocket,
  ii) providing a second wall liner, wherein the second wall liner includes
    a second planar portion,
  iii) with the first wall liner positioned in a first orientation, wherein in the first orientation the first planar portion extends generally horizontally and the at least one border wall extends upward from the first planar portion,
    filling the pocket with flowable cement,
  iv) subsequent to (a)(iii) and with the first wall liner in the first orientation, attaching the second wall liner and the first wall liner in fixed relation such that the cement in the pocket is generally surrounded by the first and second wall liners,
  v) subsequent to (a)(iv), storing the wall panel in the first orientation, wherein the cement at least partially hardens during storage,
b) subsequent to (a)(v) assembling the wall panel in joined relation with at least one other wall panel to form the chest.
2. The method according to claim 1 and further including
(a)(vi) prior to (a)(iii), attaching at least one spacer in fixed operative connection with the first planar portion, wherein the at least one spacer extends in the pocket and transversely of the first planar portion,
  wherein in (a)(iv) the second wall liner is engaged with the at least one spacer.
3. The method according to claim 2 wherein at least one spacer comprises an elongated bracket,
  wherein (a)(vi) includes fixably attaching each elongated bracket and the first planar portion in a plurality of disposed locations.
4. The method according to claim 2
wherein in (a)(vi) the at least one spacer comprises a spacer block.
5. The method according to claim 2
wherein one of the at least one spacer and the first planar portion includes a hole,
  wherein in (a)(vi) the at least one spacer is attached in fixed operative connection with the first planar portion via plug welding in the hole.
6. The method according to claim 2
wherein in (a)(vi) a plurality of disposed spacers are attached in fixed operative connection with the first planar portion,
  wherein in (a)(iv) a second wall liner is attached in fixed engagement with each of the plurality of spacers.
7. The method according to claim 6
wherein each spacer includes a first side and an opposed second side,
wherein in (a)(vi) the first side of each spacer is held in abutting engagement with the first planar portion,
wherein subsequent to (a)(iii) the second side of each spacer is accessible by not being below an upper surface of the cement in the pocket,
wherein (a)(iv) includes attaching the second wall liner and the second side of each spacer in fixed engagement.
8. The method according to claim 7
wherein the second planar portion includes at least one hole,
wherein in (a)(iv) the second wall liner is attached to at least one spacer by plug welding within the at least one hole.
9. The method according to claim 8
wherein the plurality of spacers include a plurality of elongated brackets,
wherein the second planar portion includes a plurality of disposed holes,
wherein in (a)(iv) each elongated bracket is attached in fixed relation with the second wall liner in a plurality of disposed locations by plug welding the plurality of the disposed holes in the second planar portion.
10. The method according to claim 7
wherein in (a)(i) the first wall liner includes at least one flange portion,
wherein in the first orientation the at least one flange portion extends from a top of the border wall and outwardly away from the first pocket,
wherein in (a)(iv) the second wall liner is attached in fixed relation to the at least one flange portion of the first wall liner.
11. The method according to claim 10
wherein at least one of the second wall liner and the at least one flange portion includes a plurality of holes,
wherein in (a)(iv) the second wall liner is attached in fixed engagement to the at least one flange portion of the first wall liner by plug welding in the plurality of holes.
12. The method according to claim 10
wherein the wall panel includes a transverse panel opening therethrough,
wherein in (a)(i) the first wall liner includes a first wall liner opening in the first planar portion corresponding to the panel opening, and wherein at least one first barrier wall in the first orientation extends upward from the first planar portion and bounds the first wall liner opening,
wherein in (a)(ii) the second wall liner includes a second wall liner opening in the second planar portion corresponding to the panel opening,
wherein in (a)(iii) the flowable cement is prevented from flowing through the first wall liner opening by the at least one first barrier wall,
wherein in (a)(iv) the at least one first barrier wall extends transversely intermediate of the first wall liner opening and the second wall liner opening.
13. The method according to claim 12,
wherein a box including two opposed open ends includes the at least one first barrier wall, wherein the open ends generally correspond to the configuration of the first wall liner opening and the second wall liner opening,
wherein the box includes at least one box flange extending transversely to the at least one barrier wall adjacent to the at least one open end proximate to the first planar portion,
and further comprising:
prior to (a)(iii) attaching the at least one box flange and the first planar portion in a fixed engagement.

14. The method according to claim 13,
wherein the box includes at least one further box flange extending transversely of the at least one barrier wall adjacent the open end opposed of the open end proximate to the first planar portion,
wherein in (a)(iv) the second planar portion of the second wall liner is attached in fixed engagement with the at least one further box flange.

15. The method according to claim 12
wherein the first wall liner comprises an inner wall liner of the wall panel, and the second wall liner comprises an outer wall liner of the wall panel,
wherein in (a)(i) the inner wall liner includes a plurality of spaced bolt accepting liner apertures therein, wherein the bolt accepting liner apertures are configured to accept projections of a bolt operatively connected with a safe door,
and further comprising:
(a)(vii) prior to (a)(iii), attaching a reinforcing plate in operative connection with the inner wall liner, wherein the reinforcing plate includes a plurality of plate apertures in operative alignment with the liner apertures.

16. The method according to claim 15,
wherein the inner wall liner includes a plurality of holes in proximity to but separate from the liner apertures,
wherein in (a)(vii) the reinforcing plate is attached in operative fixed connection with the first planar portion of the inner wall liner by plug welding in the plurality of holes in the inner wall liner.

17. The method according to claim 15 and further comprising:
subsequent to (a)(vii) and prior to (a)(iii) attaching a security plate in fixed operative connection with the reinforcing plate, wherein in the first orientation the security plate overlies the plurality of plate apertures.

18. The method according to claim 15 and further comprising:
(a)(ix) prior to (a)(iii), attaching a support leg accepting tube and the inner wall liner in fixed connection, wherein the leg accepting tube includes a tube opening, wherein the tube opening is in aligned relation with a border wall opening in the border wall.

19. The method according to claim 15
wherein the second wall liner includes an outer wall liner of the wall panel,
wherein the outer wall liner includes at least one peripheral tab portion, wherein the at least one peripheral tab portion extends outward beyond the flange portion of the inner wall liner,
wherein in (b) the at least one peripheral tab portion is welded in fixed connection with at least one other wall panel.

20. The method according to claim 19
wherein the at least one peripheral tab portion includes a perpendicular portion that extends perpendicular to the second planar portion, and wherein in (b) the perpendicular portion of the peripheral tab portion is welded in fixed connection with at least one other wall panel.

21. The method according to claim 19 wherein in (b) the wall panel is welded in fixed connection with at least three other wall panels, wherein each of the at least three other wall panels include respective pockets with cement therein.

22. The method according to claim 1
wherein in (a)(i) the first wall liner includes at least one flange portion,
wherein in the first orientation the at least one flange portion extends from a top of the border wall and outwardly away from the first pocket,
wherein in (a)(iv) the second wall liner is attached in fixed relation to the at least one flange portion of the first wall liner.

23. The method according to claim 1
wherein the wall panel includes a transverse panel opening therethrough,
wherein in (a)(i) the first wall liner includes a first wall liner opening in the first planar portion corresponding to the panel opening, and wherein in the first orientation at least one first barrier wall extends upward from the first planar portion and bounds the first wall liner opening,
wherein in (a)(ii) the second wall liner includes a second wall liner opening in the second planar portion corresponding to the panel opening,
wherein in (a)(iii) the flowable cement is prevented from flowing through the first wall liner opening by the at least one first barrier wall,
wherein in (a)(iv) the at least one first barrier wall extends transversely intermediate of the first wall liner opening and the second wall liner opening.

24. The method according to claim 1
wherein the first wall liner comprises an inner wall liner of the wall panel, and the second wall liner comprises an outer wall liner of the wall panel,
wherein in (a)(i) the inner wall liner includes a plurality of spaced bolt accepting liner apertures therein, wherein the bolt accepting liner apertures are configured to accept projections of a bolt operatively connected with a safe door,
and further comprising:
(a)(vi) prior to (a)(iii), attaching a reinforcing plate in operative connection with the inner wall liner, wherein the reinforcing plate includes a plurality of plate apertures in operative alignment with the bolt accepting liner apertures.

25. The method according to claim 1 and further comprising:
(a)(vi) prior to (a)(iii), attaching in fixed connection a support leg accepting tube and the inner wall liner, wherein the leg accepting tube includes a tube opening, wherein the tube opening is in aligned relation with a border wall opening in the border wall.

26. The method according to claim 1
wherein the second wall liner includes an outer wall liner of the wall panel,
wherein the outer wall liner includes at least one peripheral tab portion, wherein the at least one peripheral tab portion extends outward beyond the flange portion of the inner wall liner,
wherein in (b) the at least one peripheral tab portion is welded in fixed connection with at least one other wall panel.

27. The method according to claim 1 wherein in (b) the wall panel is welded in fixed connection with at least three other wall panels, wherein each of the at least three other wall panels include respective pockets with cement therein.

* * * * *